United States Patent
Srinivasan et al.

(10) Patent No.: US 10,672,548 B2
(45) Date of Patent: Jun. 2, 2020

(54) MAGNETIC FASTENER AND HINGED DEVICE USING SAME

(71) Applicant: Microsoft Technology Licensing, LLC, Redmond, WA (US)

(72) Inventors: Nishant Srinivasan, Seattle, WA (US); Daniel Clark Park, Woodinville, WA (US); Karsten Aagaard, Monroe, WA (US); Colin Tiyani Anderson, Redmond, WA (US); Michael Robert Schweers, Seattle, WA (US); Benoit Guillaume Henri Rouger, Bellevue, WA (US); Anthony Christian Reed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/824,698

(22) Filed: Nov. 28, 2017

(65) Prior Publication Data
US 2019/0164675 A1 May 30, 2019

(51) Int. Cl.
*G06F 1/16* (2006.01)
*H01F 7/02* (2006.01)
(Continued)

(52) U.S. Cl.
CPC ....... *H01F 7/0263* (2013.01); *E05B 47/0038* (2013.01); *E05C 19/16* (2013.01);
(Continued)

(58) Field of Classification Search
CPC ......... G06F 1/1616; G06F 1/1679; H01F 7/02
See application file for complete search history.

(56) References Cited

U.S. PATENT DOCUMENTS 5,510,953 A * 4/1996 Merkel ................. G06F 1/1616
200/5 A
5,631,618 A * 5/1997 Trumper ............. G03F 7/70758
104/286
(Continued)

FOREIGN PATENT DOCUMENTS

CN        105446428 A        3/2016

OTHER PUBLICATIONS

"International Search Report and Written Opinion Issued in PCT Application No. PCT1US2018/060210", dated Jan. 24, 2019, 16 pages.

*Primary Examiner* — Anthony Q Edwards
(74) *Attorney, Agent, or Firm* — Arent Fox LLP

(57) ABSTRACT

An apparatus having a fast drop-off in attraction force between magnets is provided. The apparatus includes a first magnet array having a plurality of magnets with different magnetic field orientations fixedly positioned in a first housing. The apparatus also includes an adjacent magnet assembly relative to the first magnet array and provided in a second housing that includes second and third magnet arrays, each having a plurality of magnets with different magnetic field orientations. The apparatus includes an activation mechanism configured to move the adjacent magnet assembly from at least a first relative position to a second relative position. The adjacent magnet assembly in the second relative position has a second magnetic attraction force with the first magnet array that is substantially reduced as compared to a first magnetic attraction force with the first magnet array in the first relative position. The magnet arrays may define a magnetic fastener controlling opening and/or closing of portions of a device.

26 Claims, 17 Drawing Sheets

(51) Int. Cl.
*E05B 47/00* (2006.01)
*E05C 19/16* (2006.01)
*H01F 7/04* (2006.01)
*F16B 1/00* (2006.01)

(52) U.S. Cl.
CPC ............ *G06F 1/1679* (2013.01); *H01F 7/04* (2013.01); *A44D 2203/00* (2013.01); *F16B 2001/0035* (2013.01)

(56) References Cited

U.S. PATENT DOCUMENTS

| | | | | |
|---|---|---|---|---|
| 6,366,440 | B1* | 4/2002 | Kung | E05C 19/16 361/147 |
| 7,181,238 | B2* | 2/2007 | Chiang | G06F 1/1616 361/679.26 |
| 7,543,862 | B2* | 6/2009 | Lin | E05C 19/06 292/137 |
| 7,583,500 | B2* | 9/2009 | Ligtenberg | G06F 1/1616 361/147 |
| 7,775,567 | B2* | 8/2010 | Ligtenberg | E05C 19/16 292/251.5 |
| 8,174,347 | B2* | 5/2012 | Fullerton | E05C 19/16 335/285 |
| 8,279,032 | B1* | 10/2012 | Fullerton | E05C 19/16 335/285 |
| 8,471,658 | B2* | 6/2013 | Fullerton | E05C 19/16 200/404 |
| 8,699,223 | B2* | 4/2014 | Yu | G06F 1/1679 292/251.5 |
| 8,704,622 | B2* | 4/2014 | Koepsell | H01H 36/0073 335/205 |
| 8,705,229 | B2* | 4/2014 | Ashcraft | G06F 1/1679 312/223.1 |
| 8,729,987 | B2* | 5/2014 | Chen | G06F 1/1677 335/205 |
| 8,840,200 | B2* | 9/2014 | Chen | H05K 5/0221 312/223.2 |
| 8,908,366 | B2* | 12/2014 | Wu | G06F 1/1679 292/251.5 |
| 9,997,286 | B2* | 6/2018 | Herman | H01F 7/0205 |
| 2005/0023841 | A1* | 2/2005 | Chen | E05C 19/16 292/251.5 |
| 2006/0006674 | A1* | 1/2006 | Kang | E05C 19/16 292/251.5 |
| 2006/0019703 | A1 | 1/2006 | Chiang | |
| 2008/0061565 | A1 | 3/2008 | Lee et al. | |
| 2009/0251259 | A1* | 10/2009 | Fullerton | H01F 7/0284 335/306 |
| 2013/0038988 | A1* | 2/2013 | Chen | G06F 1/1677 361/679.01 |
| 2014/0185215 | A1* | 7/2014 | Whitt, III | G06F 1/16 361/679.4 |
| 2015/0085444 | A1 | 3/2015 | Ke | |
| 2017/0017273 | A1* | 1/2017 | Weldon | G06F 1/1654 |

* cited by examiner

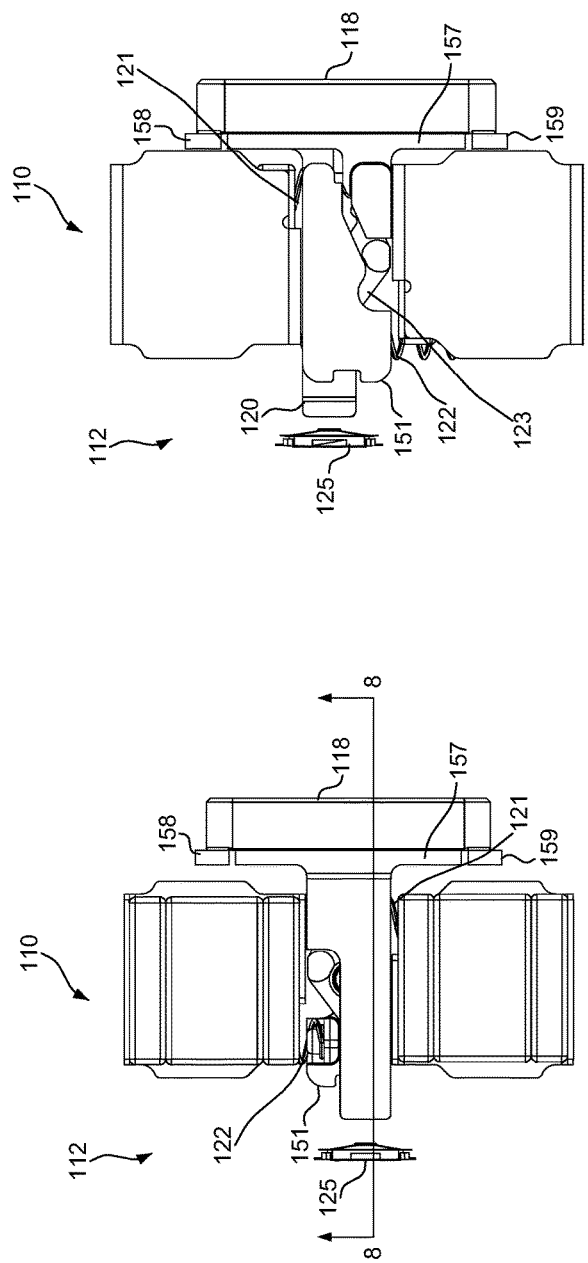
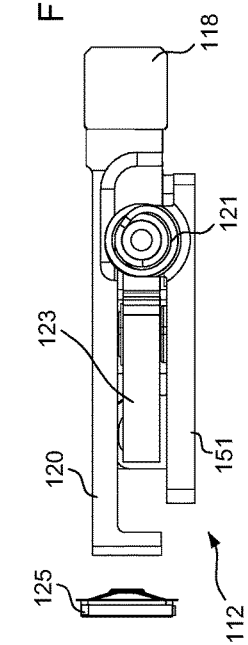

MAGNETIC FASTENER AND HINGED DEVICE USING SAME

BACKGROUND

The present disclosure relates to a magnetic fastener, and more particularly, to a magnetic fastener assembled in a hinged device.

Hinged devices may use a magnetic fastener to hold together the halves of the hinged device. Existing magnetic fastener designs typically require large amounts of space for placement of the magnetic fastener assemblies. Also, the opposing portions of current designs of magnetic fastener assemblies generally must be positioned touching each other or at extremely small gap distances in order to maintain the magnetic attraction. Additionally, current designs also use single or dual poled magnets, which require large lateral travel distances between aligned magnets to break the magnetic attraction force between the opposing magnetic assemblies. As such, there exists a need for improvement in magnetic fasteners.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

A magnet assembly having a fast drop-off in attraction force is provided. According to an aspect, the fast drop-off in the attraction force may require little mechanical movement and travel distance to separate two halves of a hinged device.

In an implementation, an apparatus includes a first housing and a second housing rotatably connected to the first housing such that the second housing and the first housing are movable between a closed position and an open position. The apparatus also includes a first magnet array having a first plurality of magnets with different magnetic field orientations fixedly positioned in the first housing and having a first magnetic field. Further, the apparatus includes an adjacent magnet assembly relative to the first magnet array, the adjacent magnet assembly including one or more magnet arrays of a plurality of magnets with different magnetic field orientations defining at least a second magnetic field alignable with at least a portion of the first magnetic field. Also, the apparatus includes an activation mechanism configured to move the adjacent magnet assembly from at least a first relative position to a second relative position. In this case, the adjacent magnet assembly in the second relative position has a second magnetic attraction force with the first magnet array that is substantially reduced as compared to a first magnetic attraction force with the first magnet array in the first relative position.

In another implementation, an apparatus includes a first housing and a second housing rotatably connected to the first housing such that the second housing and the first housing are movable between a closed position and an open position. The apparatus includes a first magnet array having a first plurality of magnets with different magnetic field orientations fixedly positioned in the first housing and having a first magnetic field. The apparatus also includes an adjacent magnet assembly relative to the first magnet array, the adjacent magnet assembly including a second magnet array and a third magnet array. The second magnet array has a second plurality of magnets with different magnetic field orientations defining a second magnetic field alignable with a first portion of the first magnetic field, and the third magnet array has a third plurality of magnets with different magnetic field orientations defining a third magnetic field alignable with a second portion of the first magnetic field. The apparatus includes an activation mechanism configured to move the adjacent magnet assembly from at least a first relative position to a second relative position, wherein adjacent magnet assembly in the second relative position has a second magnetic attraction force with the first magnet array that is substantially reduced as compared to a first magnetic attraction force with the first magnet array in the first relative position.

In another implementation, a method of connecting or disconnecting a hinged device having a first and second housing, includes receiving a force at an activation mechanism to detach the first housing from the second housing, the first housing including a first magnet array having a first plurality of magnets with different magnetic field orientations fixedly positioned in the first housing, and the second housing including a movably positionable adjacent magnet assembly in or more magnet arrays having at least a second plurality of magnets with different magnetic field orientations. Further, the method includes moving, by the force at the activation mechanism, the adjacent magnet assembly between a first relative position and a second relative position. In this case, the adjacent magnet assembly in the second relative position has a second magnetic attraction force with the first magnet array that is substantially reduced as compared to a first magnetic attraction force with the first magnet array in the first relative position.

In a further implementation, a computer device includes a magnetic fastener having at least a first portion movable relative to a second portion between an open position and a closed position, an activation mechanism, and a switch. The activation mechanism includes a plunger having a longitudinal body with an end, the plunger movable between an undepressed position and a depressed position, and an actuator configured to move at least one of the first portion and the second portion of the fastener from a first relative position to a second relative position in response to the plunger moving from the undepressed position to the depressed position, wherein one of the first relative position and the second relative position corresponds to the open position of the magnetic fastener, and wherein a remaining one of the first relative position and the second relative position corresponds to the closed position of the magnetic fastener. Additionally, the switch is contactable by the end of the plunger in the depressed position, wherein the switch is configured to activate or deactivate a function on the computer device.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The specific features, implementations, and advantages of the disclosure will become better understood with regard to the following description, appended claims, and accompanying drawings where:

FIGS. 6, 7, and 8 are a top view in an unactuated position, a bottom view in a near fully actuated position, and a cross-sectional view along line 8-8 of FIG. 6, respectively, of the activation mechanism and magnet arrays of the magnetic fastener of the device of FIG. 1.

DETAILED DESCRIPTION

Figure 1:
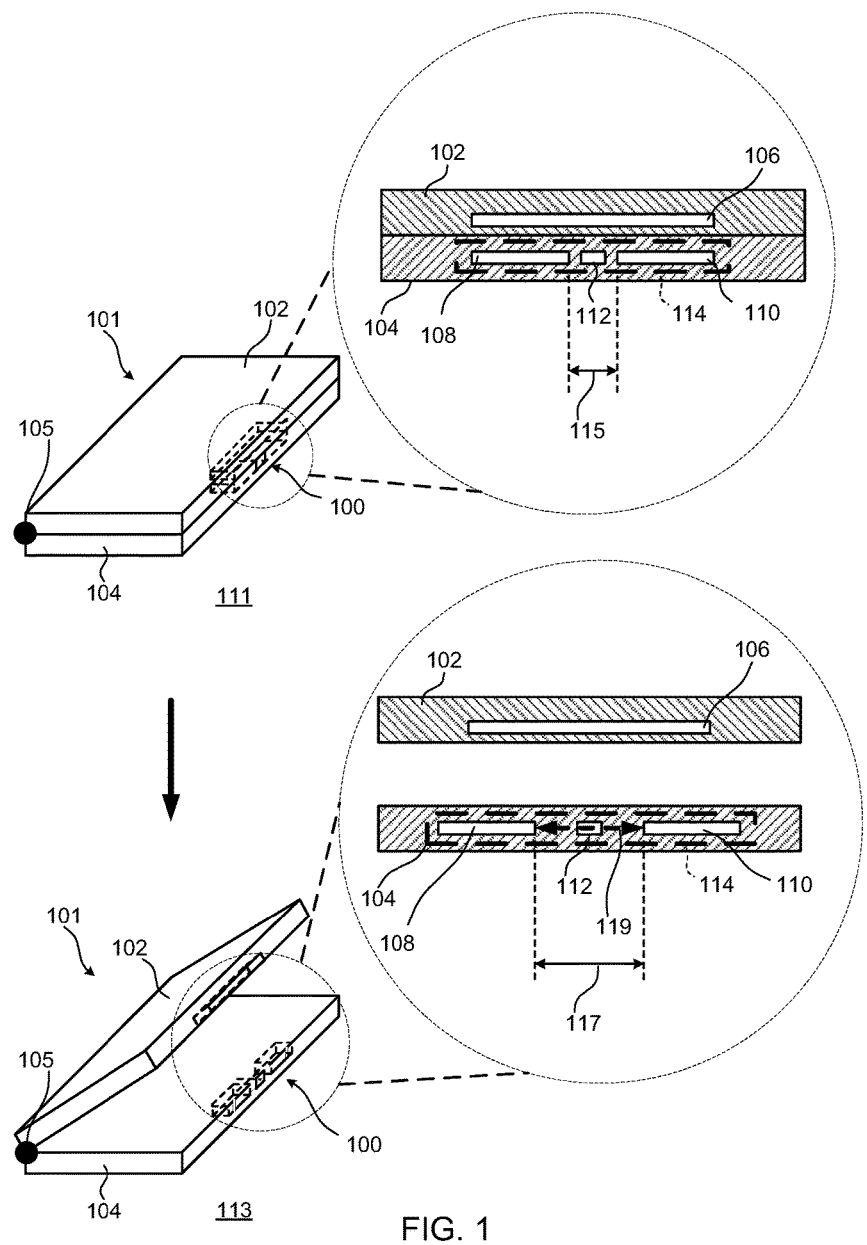
FIG. 1 is a perspective view of a magnetic fastener in a hinged device, respectively in a closed and open position, including respective inset cross-sectional front views highlighting the opposing magnet arrays of the magnetic fastener, according to an implementation.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In some implementations, examples may be depicted with reference to one or more components and one or more methods that may perform the actions or operations described herein, where components and/or actions/operations in dashed line may be optional.

The present disclosure relates to a magnetic fastener having a fast drop-off in attraction force between opposing sets of magnet arrays. The fast drop-off in the attraction force may be achieved with a relatively small mechanical movement and travel distance, as compared to existing designs, to reduce, break, or reverse the magnetic attraction between the opposing magnet arrays, which may be installed on opposing portions of a hinged device. In an implementation, the attraction force may quickly reduce when at least one of the opposing sets of magnet arrays are moved laterally, thereby enabling separation of the opposing portions of a hinged device. According to an implementation, the hinged device may be, for example a computer device with a first housing and a second housing within which opposing magnet arrays of the magnetic fastener may be mounted. For instance, in one implementation, the first housing may have a first magnet array mounted in a fixed position and with magnets configured to define a first flux fountain. Further, in this implementation, the second housing may have an adjacent magnet assembly, which may include one or more magnet arrays that are integral or that are separate components, movably positioned within the second housing. In the case where the second and third magnet arrays are separate components, they may be movably positioned in the second housing relative to one another. The one or more magnet arrays each include magnets configured to define a respective flux fountain (e.g., a second flux fountain and a third flux fountain respectively corresponding to a second magnet array and third magnet array). The one or more magnet arrays may be positioned relative to the first magnet array and laterally moveable (in some cases, relative to one another) such that one or more flux fountains are moved into or out of relative alignment with the first flux fountain to increase, decrease, or reverse magnetic attraction between the first magnet array and the opposing adjacent magnet assembly. For example, in a first position, the adjacent magnet assembly (e.g., in some cases including separate the second and third magnet arrays) may exhibit a first magnetic attraction force with the first magnet array strong enough to hold the first and second housing of the hinged device in closed position. In a second position, which may be achieved by an activation mechanism operating to laterally move the adjacent magnet assembly (e.g., including in some cases moving the second and third magnet arrays away from one another) such that the adjacent magnet assembly may exhibit a second magnetic attraction force, which is reduced relative to or opposite of the first magnetic attraction force with the first magnet array, allowing the hinged device to open.

In some implementations, the magnetic fastener of the present disclosure may be sized to fit within a relatively small amount of space, as compared to existing solutions, due to the configuration of the one or more flux fountains or mini- or partial-flux fountains of the adjacent magnet assembly being relatively alignable with the first flux fountain. This movably positionable alignment of the flux fountains creates an additive magnetic field having relatively high magnetic attraction forces with a relatively steep drop off rate, as compared to existing solutions. Due to the steep drop off rate in magnetic attraction force, a relatively small amount of lateral movement (as compared to existing solutions) can result in substantially reducing, or even reversing, the magnetic attraction forces between the first magnet array and the one or more magnet arrays of the adjacent magnet assembly. This relatively small amount of lateral movement enables the magnetic fastener of the present disclosure to take up less space within a hinged device, as compared to existing solutions, which can be important when a size of the hinged device is desired to be relatively small or when space is needed for other components of the hinged device.

Further, in some additional or alternative implementations, the magnetic fastener of the present disclosure may maintain the magnetic attraction force between the first magnet array and the adjacent magnet assembly (e.g., an integral magnet array or separate second and third magnet arrays) at relatively large gap distances, as compared to existing solutions. For example, when the hinged device is in a closed position, the gap distance between the opposing magnet arrays of the present disclosure may be relatively large, as compared to current solutions, due to the increased magnetic field resulting from the additive effect of aligning the one or more flux fountains of the adjacent magnet assembly with the first flux fountain of the first magnet array. As such, the magnetic fastener of the present disclosure can operate effectively to maintain the portions of the hinged device in the closed position, even at this increased gap distance. This feature may be desirable in order to allow other portions of the hinged device, such as the walls of the housings containing the magnetic fastener, to be thicker for greater structural stability or to allow for clearance for other components in a space between the closed portions of the hinged device.

Referring to FIG. 1, an example magnetic fastener 100 includes a first magnet array 106 opposed by an adjacent magnet assembly 114, which may be laterally movable to increase, or to reduce or reverse, a magnetic attraction force with the first magnet array 106. In some cases, the adjacent magnet assembly may be an integral magnet array, while in other cases it may be two or more relatively movable magnet arrays, such as but not limited to a second magnet array 108 and a third magnet array 110. The magnetic fastener 100 may be used to connect together or release adjacent portions of a device 101, such as to allow the device 101 to move between a closed position 111 and an open position 113. In an example implementation, the device 101 may have a first housing 102 rotatably connected a second housing 104 by a connector 105, such as but not limited to a hinge, a linkage or foldable element, or any other mechanism connecting adjacent portions of the device 101 while enabling relative rotation between the closed position 111 and the open position 113. While the relative rotation illustrated in FIG. 1 is about a longitudinal axis parallel to a back side of the device 101, it should be understood that the relative rotation may instead be about an axis perpendicular to a plane of the first housing 102 or the second housing 104, depending on how connector 105 is configured to rotatably connect the housings. The device 101 may be any type of device having at least two portions movable between different positions where the portions are desired to be fixed relative to one another in at least one of the positions. For instance, in some cases, the device 101 may be but is not limited to a computer, a personal digital assistant, a gaming device, a mobile phone, or a device that holds other objects (e.g., makeup, cigarette, or business card holder), to name a few examples. Further, in some cases such as when the device 101 is the computer, personal digital assistant, gaming device, or mobile phone, the first housing 102 and the second housing 104 may include other functional components. For example, in some cases, the first housing 102 may include a display or graphical interface for user interaction, and the second housing 104 may include a virtual or mechanical keypad or keyboard.

More specifically, in an example implementation, the first magnet array 106 may be fixedly mounted within the first housing 102, and may have a first magnetic field that extends toward the adjacent magnet assembly 114 including the second magnet array 108 and the third magnet array 110 when the device 101 approaches or is in the closed position 111. The first magnet array 106 may have a plurality of magnets that longitudinally extend in at least one direction, and which may be aligned in a plane. As mentioned, the adjacent magnet assembly 114 (which in some cases may include the second magnet array 108 and the third magnet array 110) may be movably positioned in the second housing 104, and relative to the first magnet array 106. The adjacent magnet assembly 114 may each have a plurality of magnets that have a magnetic field that extends toward the first magnet array 106 and that are longitudinally aligned within the second housing 104 so as to be in a spaced apart position, e.g., a gap distance, adjacent to the first magnet array 106 when the device 101 is in the closed position 111. For example, in the closed position 111 of the device 101, the second magnet array 108 and the third magnet array 110 in the second housing 104 may be aligned in a plane substantially parallel to the plane in which the first magnet array 106 extends within the first housing 102.

In an implementation, the adjacent magnet assembly 114, and hence the second magnet array 108 and the third magnet array 110, are movable between at least a first relative position 115 having a first magnetic attraction with the first magnet array 106 sufficient to maintain the device 101 in the closed position 111, and a second relative position 117 having a second magnetic attraction that is reduced or opposite of the first magnetic attraction. This reduction in or reversal of magnetic attraction allows or promotes moving the device 101 into the open position 113. The dashed line 119 with arrowheads in both directions represents the movement between the first relative position 115 and the second relative position 117. In the first relative position 115, one or more magnetic fields of the adjacent magnet assembly 114 may be substantially aligned with, and hence additive to, corresponding portions of the magnetic field of the first magnet array 106. In a case where the adjacent magnet assembly 114 includes two or more magnet arrays, such as the second and third magnet arrays 108 and 110, a magnetic field of the second magnet array 108 may be substantially aligned with, and hence additive to, a first portion of the magnetic field of the first magnet array 106, and a magnetic field of the third magnet array 110 may be substantially aligned with, and hence additive to, a second portion of the magnetic field of the first magnet array 106. Further, in the second relative position 117, the one or more magnetic fields of the adjacent magnet assembly 114 may be misaligned relative to corresponding portions of the magnetic field of the first magnet array 106, thereby reducing or reversing the magnetic attraction force therebetween. In the case where the adjacent magnet assembly 114 includes two or more magnet arrays, such as the second and third magnet arrays 108 and 110, the second magnet array 108 and the third magnet array 110 may be laterally positioned further away from one another, and further away from the opposing portion of the first magnet array 106, as compared to the first relative position 115. As a result, in the second relative position 117 as compared to the first relative position 115, the magnetic field of the second magnet array 108 may be moved further out of alignment with the first portion of the magnetic field of the first magnet array 106, and the magnetic field of the third magnet array 110 may be moved further out of alignment with the second portion of the magnetic field of the first magnet array 106, thereby creating a reduced or opposite magnetic attraction. In an implementation, an amount of lateral movement of the adjacent magnet assembly 114 (and/or the second magnet array 108 and the third magnet array 110) relative to the respective opposing portions of the first magnet array 106 may be less than a width of a magnet in the respective magnet array, resulting in substantially reduced, zero, or reversed magnetic attraction in the second relative position 117 as compared to the first relative position 115. Thus, when mounted on device 101, by moving the adjacent magnet assembly 114 (and/or the second magnet array 108 and the third magnet array 110) to the second relative position 117, the first and second housings 102, 104 of the device 101 may be moved into one or more open positions 113 by applying a force that overcomes the reduced amount of magnetic attraction, or automatically in response to an opposite, repelling or biasing force created by movement of the adjacent magnet assembly 114 (and/or the second magnet array 108 and the third magnet array 110) into the second relative position 117.

The magnetic fastener 100 may include an activation mechanism 112 configured to move the adjacent magnet assembly 114 (and/or the second magnet array 108 and the third magnet array 110) between the different relative positions, e.g., at least the first relative position 115 and the second relative position 117. Activation mechanism 112 may be movably positionable relative to the adjacent magnet assembly 114 (and/or the second magnet array 108 and the third magnet array 110) to effectively maintain the device 101 in the closed position 111 or to allow or automatically enable the device 101 to move into the open position 113. The activation mechanism 112 may include but is not limited to, for example, one or more lever assemblies, one or more pistons, one or more actuators, one or more linkages, or any combination thereof, configured to move the adjacent magnet assembly 114 (and/or the second magnet array 108 and the third magnet array 110) from at least one relative position to another. When the activation mechanism 112 is actuated, for example, one or more parts of the activation mechanism 112 may contact the adjacent magnet assembly 114 (and/or each of the second magnet array 108 and third magnet array 110) to move it (and/or them) from the first relative position 115 to the second relative position 117. In the case where the adjacent magnet assembly 114 includes separate magnet arrays, e.g., the second magnet array 108 and the third magnet array 110, operation of activation mechanism 112 may cause the second magnet array 108 and the third magnet array 110 may move laterally out of alignment with the first magnet array 106, such as but not limited to in opposite directions. According to an implementation, in the respective second position 117, the adjacent magnet assembly 114 (and/or the second magnet array 108 and the third magnet array 110) may have a substantially reduced, zeroed out, or reversed magnetic attraction force with the first magnet array 106 as compared to a magnetic attraction in the respective first position 115.

Figure 2A:
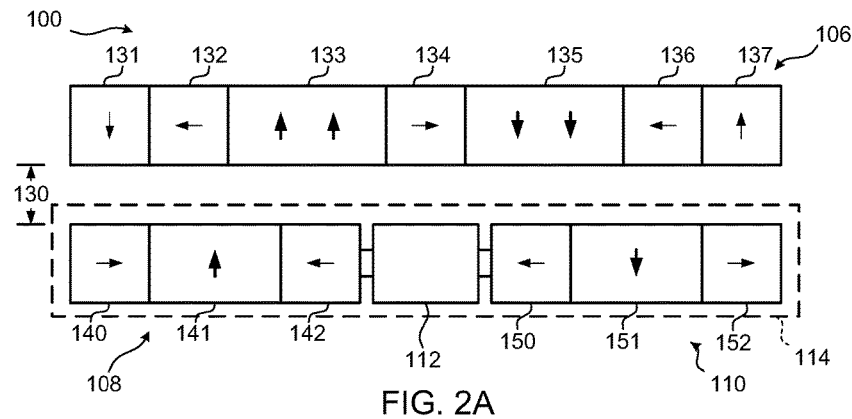
FIGS. 2A, 2B, and 2C are front views of examples of the magnet arrays of the magnetic fastener of FIG. 1 including arrows on each magnet in the magnet arrays to indicate a direction of a magnetic field.
Figure 2B:
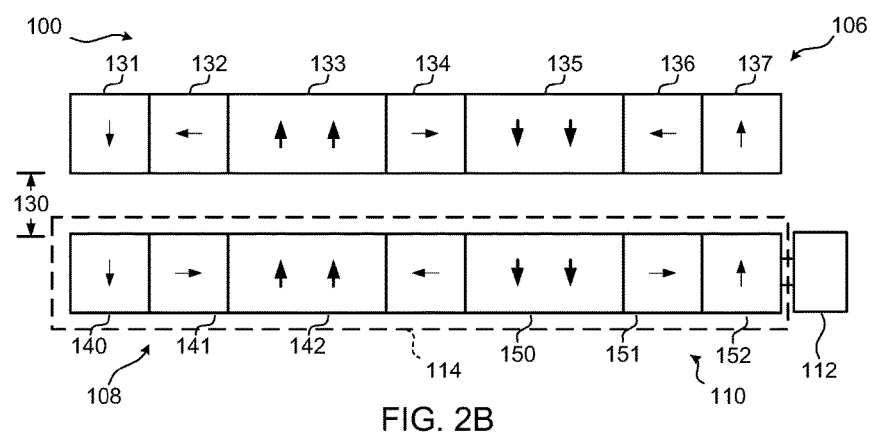
Figure 2C:
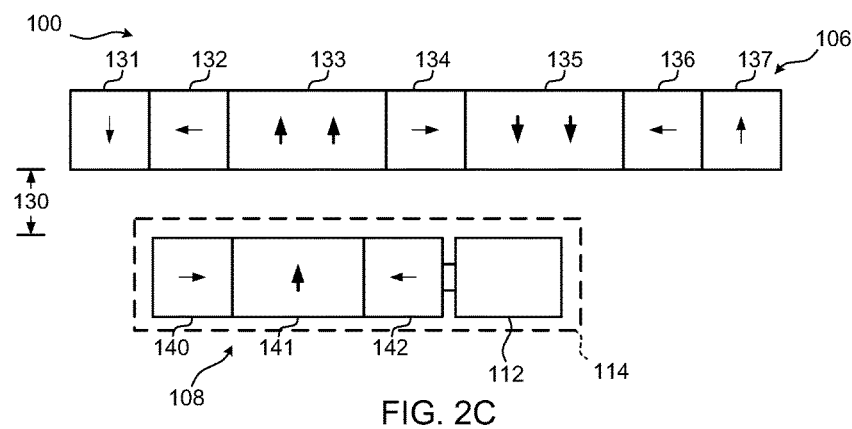

Referring to FIGS. 2A-2C, example configurations of magnet arrays and magnets of the magnetic fastener 100 includes the first magnet array 106 and various configurations of the adjacent magnet assembly 114 having a plurality of magnets with a number of differently-oriented magnetic fields. For instance, in FIG. 2A, the adjacent magnet assembly 114 includes the second magnet array 108 and the third magnet array 110 laterally movable relative to one another, and relative to the first magnet array 106. Also, for instance in FIG. 2B, the adjacent magnet assembly 114 includes a plurality of magnets essentially identical to the first magnet array 106, but rotated 180 degrees, and laterally movable relative to the first magnet array 106. Further, for instance in FIG. 2C, the adjacent magnet assembly 114 includes a mini-magnet array, such as but not limited to the second magnet array 108, laterally movable relative to the first magnet array 106. Although FIG. 2C includes the second magnet array 108, it should be understood that it may alternately include the third magnet array 110, or another magnet array having less than the number of magnets of the first magnet array 106 but having at least one flux fountain alignable with at least a portion of the magnetic field of the first magnet array 106. Similarly, although not illustrated, it should be understood that the first magnet array 106 may have other configurations, such as but not limited to removing the two outside magnets (e.g., magnets 131 and 137), or such as being a mini-array similar to the second and third magnet arrays 108 and 110. In an implementation, the first magnet array 106 and the adjacent magnet assembly 114 may each include a set of bar magnets held together, such as by a mechanical structure (e.g., a frame), an adhesive (e.g., a glue or epoxy), or some combination of both.

In FIG. 2A, in one implementation that should not be construed as limiting, for example, the first magnet array 106 may include bar magnets 131-137, each having a different orientation from a respective neighboring magnet. For instance, the first magnet array 106 may be configured as a flux fountain or Halbach array that utilizes a multi-directional pole arrangement of magnets. A flux fountain may include magnets of two or more sizes, while a Halbach array may include magnets of a same or similar size. In this example implementation, the first magnet array 106 may be configured as a flux fountain utilizing a multi-directional pole arrangement of magnets, some having different sizes, that augment a magnetic field on one side of the first magnet array 106 while cancelling the magnetic field to near zero on the other side. The cancellation may be known, for example as a one-sided flux distribution, e.g., flux fountain. In this example implementation, the first magnet array 106 may include seven bar magnets 131-137 coupled together to exhibit a flux distribution on a bottom side of the first magnet array 106. An alignment illustrating a direction of the magnetic field of each of the magnets 131-137 is indicated using arrows.

For example, in the first magnet array 106, the magnet 133 is disposed between the magnets 132 and 134, which have magnetic fields in opposite directions along an axis substantially perpendicular to an axis of the magnetic field of the magnet 133, which is in a direction toward the top side of the first magnet array 106. Based on the magnetic fields of the magnets 132 and 134 pointing in a direction away from the magnet 133, the strength of the magnetic field of the magnet 133 may be weakened at the top side of the first magnet array 106 and strengthened at the bottom side of the first magnet array 106. This creates a first portion of the magnetic field of the first magnet array 106. Further, the magnet 135 is disposed between the magnets 134 and 136, which are pointed towards each other and have a magnetic field along an axis substantially perpendicular to an axis of the magnetic field of the magnet 135, which is in a direction toward the bottom side of the first magnet array 106. Based on the magnetic fields of the magnets 134 and 136 pointing in a direction towards the magnet 135, the strength of the magnetic field of the magnet 135 may be weakened at the top side of the first magnet array 106 and strengthened at the bottom side of the first magnet array 106. This creates a second portion of the magnetic field of the first magnet array 106. Further, the magnet 131 causes the magnetic field of the magnet 133 to further weaken at the top side of the first magnet array 106 and further increases the strength of the magnetic field at the bottom side of the first magnet array 106. The magnet 137 causes the magnetic field of the magnet 135 to further weaken at the top side of the first magnet array 106 and further increase the strength of the magnetic field at the bottom side of the first magnet array 106. Additionally, in this example, magnets 133 and 135 may have a larger width as compared to magnets 131, 132, 134, 136, and 137, thereby defining a flux fountain configuration. Thus, a first magnet array 106 configured in this manner may exhibit a strong magnetic attraction force along the bottom side of the first magnet array 106.

In one implementation that should not be construed as limiting, for example, the second and third magnet arrays 108 and 110 may include bar magnets 140-142 and 150-152, respectively, each having a different orientation from a respective neighboring magnet. For instance, the second and third magnet arrays 108 and 110 may be configured as mini- or partial-flux fountains each having an arrangement of three magnets to exhibit a flux distribution on a top side of the second and third magnet arrays 108 and 110. In another example implementation, the second and third magnet arrays 108 and 110 may be configured as mini or partial Halbach arrays. The second and third magnet arrays 108 and 110 may be configured to have a similar flux distribution as the first magnet array 106, but in a different, cooperating orientation (in at least the closed position 111). For example, an orientation of the second and third magnet arrays 108 and 110 may be rotated 180° relative to the first magnet array 106 to have a flux distribution on a top side of the second and third magnet arrays 108 and 110 similar to the flux distribution on the bottom side of the first magnet array 106. That is, magnets 140, 141 and 142 of the second magnet array 108 and magnets 150, 151, and 152 of the third magnet array 110 may be rotated 180° relative to the middle five magnets 132-136 of the first magnet array 106, with magnets 142 and 150 essentially being a split of magnet 134. Specifically, the magnet 142 of the second magnet array 108 and the magnet 152 of the third magnet array 110 and separated by the activation mechanism 112 correspond to a 180° rotated and split version of the magnet 134 of the first magnet array 106. In the example configuration, an alignment of a magnetic field of each of the magnets 140, 141 and 142 of the second magnet array 108 and magnets 150, 151, and 152 of the third magnet array 110 is indicated using arrows.

For example, in the second magnet array 108, the magnet 141 is disposed between the magnets 140 and 142, which have magnetic fields pointed towards each other and along an axis perpendicular to an axis of the magnetic field of the magnet 141, which is in a direction toward the top side of the second magnet array 108. Based on the magnetic fields of the magnets 140 and 142 pointing towards the magnet 141, the strength of the magnetic field of the magnet 141 is strengthened at the top side of the second magnet array 108 and substantially weakened at the bottom side of the second magnet array 108. In this manner, the magnetic field of the second magnet array 108 may, in some relatively aligned positions, be additive to the portion of the magnetic field generated by magnets 132, 133, and 134 of the first magnet array 106. Similarly, in the third magnet array 110, the magnet 151 is disposed between the magnets 150 and 152, which have magnetic fields pointed opposite to each other and along an axis perpendicular to an axis of the magnetic field of the magnet 151, which is in a direction toward the top side of the third magnet array 110. Based on the magnetic fields of the magnets 150 and 152 pointing in a direction away from the magnet 151, the strength of the magnetic field of the magnet 151 is strengthened at the top side of the third magnet array 110 and weakened at the bottom side of the third magnet array 110. In this manner, the magnetic field of the third magnet array 110 may, in some relatively aligned positions, be additive to the portion of the magnetic field generated by magnets 134, 135, and 136 of the first magnet array 106. Additionally, in this example, magnet 141 of second magnet array 108 may have a larger width as compared to magnets 140 and 142, and magnet 151 of third magnet array 110 may have a larger width as compared to magnets 150 and 152, thereby defining a flux fountain configuration. Thus, the second and third magnet arrays 108 and 110 configured in this manner and in the first relative position 115 may exhibit a relatively strong magnetic attraction force (e.g., stronger than a similar arrangement of opposing north-south aligned magnets) with the first magnet array 106, as the second and third magnet arrays 108 and 110 in the first relative position 115 create a magnetic attraction force between the bottom side of the first magnet array 106 and the top side of the second and third magnet arrays 108 and 110 sufficient to maintain the device 101 in the closed position 111.

The second and third magnet arrays 108 and 110 may be aligned along the same longitudinal axis with the activation mechanism 112 separating the second and third magnet arrays 108 and 110. In this implementation, the activation mechanism 112 is capable of substantially reducing, breaking, or reversing a flux between the second and third magnet arrays 108 and 110 and the first magnet array 106 by laterally moving the second and third magnet arrays 108 and 110 relative to the first magnet array 106 to misalign their cooperating or additive magnetic fields. The activation mechanism 112 may be configured with various actuators, levers, and/or biasing elements contactable with the second and third magnet arrays 108 and 110 to assist in laterally moving the second and third magnet arrays 108 and 110 between the first relative position 115 and the second relative position 117. In an implementation, these actuators, levers, and/or biasing elements may be extendably or rotatably contactable with the second and third magnet arrays 108 and 110. As mentioned, the magnet 142 of the second magnet array 108 and the magnet 152 of the third magnet array 110 are spaced apart by at least a portion of the activation mechanism 112. Without the activation mechanism 112 separating the magnet 142 and 152, a magnetic attraction force existing between the second magnet array 108 and the third magnet array 110 would bring the second and third magnet arrays 108 and 110 in contact with each other. As such, the second and third magnet arrays 108 and 110 tend to generally exhibit a magnetic attraction force that moves the second and third magnet arrays 108 and 110 in a direction towards each other. The actuators, levers, and/or biasing elements configured with the activation mechanism 112 may provide a counteracting force to laterally move the second and third magnet arrays 108 and 110 in an opposing direction, for example, from the first relative position 115 to the second relative position 117, and cancel out or create an opposing magnetic attraction force between the second and third magnet arrays 108 and 110.

The bottom side of the first magnet array 106 and the top side of the second and third magnet arrays 108 and 110 may be spaced apart by a gap distance 130. For example, the flux fountain configuration of magnetic fastener 100 allows for a relatively larger magnetic attraction force at greater distances as compared to current solutions (e.g., a similar arrangement of opposing north-south aligned magnets). In an implementation utilizing the flux fountain configuration of magnet arrays in which the first magnet array 106 is substantially aligned with the second and third magnet arrays 108 and 110 in the first relative position 111, the gap distance 130 may be relatively large as compared to current solutions while allowing the device 101 to maintain the closed position 111 at the gap distance 130. For example, in some cases, the gap distance 130 may be greater than an amount of relative movement between the second and third magnet arrays 108 and 110 to move the device 101 into the open position 113. Further, for example, in this case, the lateral distance moved by each of the second and third magnet arrays 108 and 110 may be less than a lateral width of any of the magnets in the respective magnet arrays. Additionally, it should be noted that a size of the center magnet 134 of first magnet array 106, as well as gap distance 130, may be adjusted to configure magnetic fastener 100 with different magnetic attraction forces and drop-off rates.

In the example implementation of FIG. 2B, the single, integral magnet array defined by plurality of magnets the adjacent magnet assembly 114 have similar features and properties as described herein with respect to the second and third magnet arrays 108 and 110, but with a center magnet that may essentially be magnets 142 and 150 integrated into a single magnet. Further, in this case, the activation mechanism may be positioned on any side (left, right, front, back) of the adjacent magnet assembly 114 so as to be able to contact and laterally move the adjacent magnet assembly 114.

In example implementation of FIG. 2C, the adjacent magnet assembly 114 includes the single, mini magnet array, such as the second magnet array 108 (or the third magnet array 110), and may have similar features and properties as described herein with respect to the second magnet array 108 (or third magnet array 110). Further, in this case, the activation mechanism may be positioned on any side (left, right, front, back) of the adjacent magnet assembly 114 so as to be able to contact and laterally move the adjacent magnet assembly 114.

Although the magnetic fastener 100 including the first magnet array 106 and the adjacent magnet assembly 114 may have any one of the various configurations described above, or any similar variations, for ease of explanation the remainder of this description will generally describe the magnetic fastener 100 based on the configuration of FIG. 2A.

Figure 3:
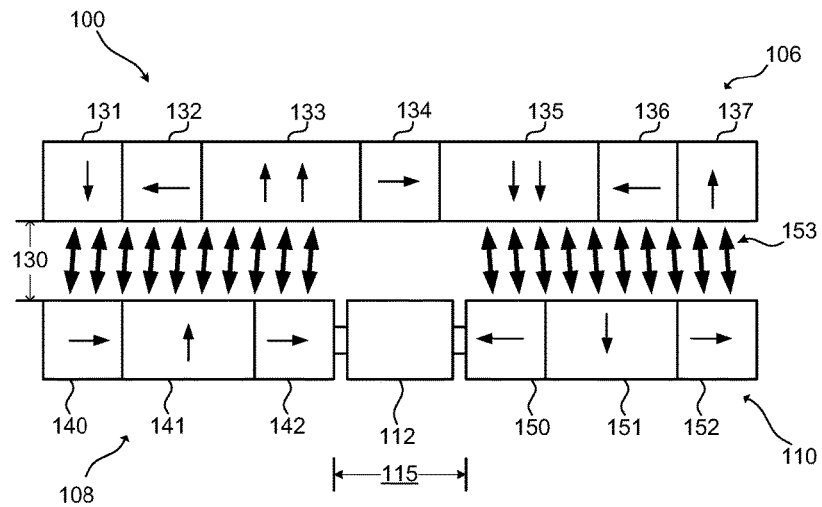
FIG. 3 is a front view of magnet arrays of the magnetic fastener of FIG. 1 with the magnet arrays in a first relative position corresponding to a closed position of the device of FIG. 1.
Figure 4:
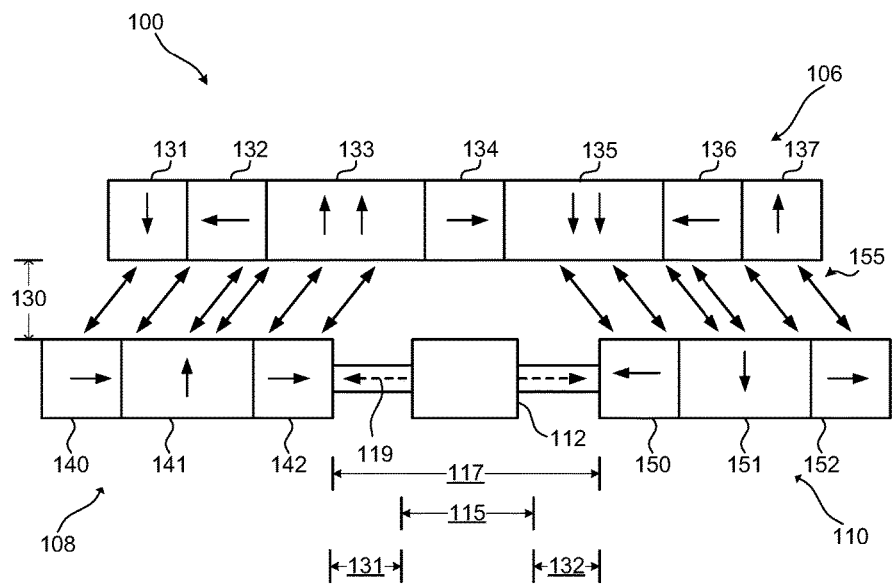
FIG. 4 is a front view of the magnet arrays of the magnetic fastener of FIG. 1 with the magnet arrays in a second relative position corresponding to an opened position of the device of FIG. 1.
Figure 5:
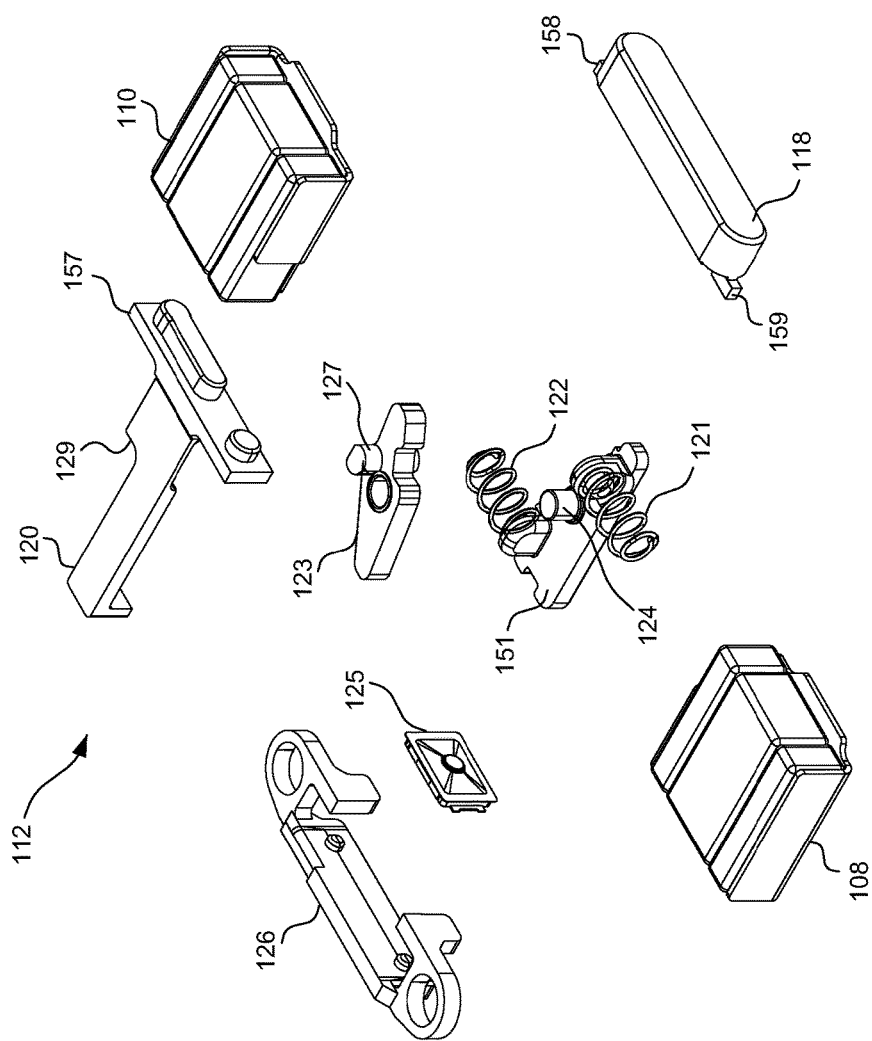
FIG. 5 is an exploded perspective view of various components of one example of the magnetic fastener of FIG. 1.

Referring to FIGS. 3 and 4, the magnetic fastener 100 with the second and third magnet arrays 108 and 110 respectively in the first relative position 115 and the second relative position 117 are described in more detail with regard to the differences in magnetic attraction in each position.

Referring to FIG. 3, when positioned at gap distance 130, and with magnetic fields substantially aligned, such as with the second and third magnet arrays 108 and 110 in the first relative position 115, the first, second, and third magnet arrays 106, 108, and 110 exhibit a relatively high attraction force 153 (illustrated by the bold arrows), e.g., strong enough to hold the device 101 (see FIG. 1) in the closed position 111. For instance, the second and third magnet arrays 108 and 110 in the first relative position 115 may correspond to the closed position 111 of the device 101 of FIG. 1. As mentioned above, a flux fountain or Halbach array configuration of the magnets exhibits a strong attraction force on one side of the array with the other side having minimal attraction. When the strong side of the first magnet array 106 faces the strong side of the second and third magnet arrays 108 and 110, a relative strong attraction force may be exhibited between the magnet arrays. For example, in first relative position 115, the magnetic field of the second magnet array 108 adds to a first portion of the magnetic field of the first magnet array 106, e.g., created by magnets 132, 133, and 134, and the magnetic field of the second magnet array 110 adds to a second portion of the magnetic field of the first magnet array 106, e.g., created by magnets 134, 135, and 136.

According to an implementation, a center magnet, e.g., magnet 134, of the first magnet array 106 may be altered in size to modify or tune the amount of magnetic attraction with the second and third magnet arrays 108 and 110. For example, a width of the center magnet 134 may be increased or decreased to respectively increase or decrease (e.g., tune) an attraction force between the first magnet array 108 and the second and third magnet arrays 108 and 110. The center magnet, e.g., magnet 134, may also be configured (e.g., to vary in size or strength) to tune a slope of a lateral drop-off rate of the magnetic attraction between the first magnet array 108 and the second and third magnet arrays 108 and 110.

Referring to FIG. 4, while maintaining the gap distance 130, activation mechanism 112 may be operated to move (e.g., in opposing directions 119) the second and third magnet arrays 108 and 110 to the second relative position 117, creating a relatively reduced, zero, or reversed (e.g., repelling) magnetic force 155 (as illustrated by the less bold arrows) with the first magnet array 106 as compared to the first relative position 115. In particular, activation mechanism 112 operates to increase misalignment between the magnetic fields, thereby causing the second and third magnet arrays 108 and 110 to exhibit the substantially reduced, zero, or reversed (e.g., repelling) magnetic force 155. For instance, the second and third magnet arrays 108 and 110 in the second relative position 117 may allow or bias the device 101 of FIG. 1 into the open position 113. In this position, the second and third magnet arrays 108 and 110, and their magnetic fields, are relatively misaligned with respect to corresponding portions, and portions of the magnetic field, of the first magnet array 106 such that the magnetic attraction force 155 is largely weakened, zeroed out, or reversed as compared to the magnetic attraction force 153 in the first relative position 115.

According to an implementation, the activation mechanism 112 is configured to move the second and third magnet arrays 108 and 110 in opposite directions 119, and laterally in a plane substantially parallel to a plane in which the first magnet array 106 extends, to decrease, zero out, or reverse the attraction force between the first magnet array 106 and the second and third magnet arrays 108 and 110. Additionally, as the second magnet array 108 and the third magnet array 110 are moved to the second relative position 117, the magnets 131 and 137 increasingly counteract or repel magnets 141 and 151, respectively, thereby reducing, zeroing out, or reversing magnetic attraction force 155 relative to magnetic attraction force 153.

In an implementation, the activation mechanism 112 may be configured to move each of the second and third magnet arrays 108 and 110 half of a total distance moved. For example, if a total distance moved is 2.4 mm, the activation mechanism 112 may laterally move each of the second and third magnet arrays 108 and 110 a distance of 1.2 mm from their respective first relative position 115 to the second relative position 117. In this implementation, a relatively small amount of lateral movement of each the second and third magnet arrays 108 and 110, at the gap distance 130, may substantially reduce, or even reverse, the magnetic attraction force between the first magnet array 106 and the second and third magnet arrays 108 and 110.

Additionally, the size, e.g. a width, of the center magnet 134 in the first magnet array 106 relative to the amount of lateral distance or movement between the second and third magnet arrays 108 and 110 from their respective first relative position 115 and the second relative position 117, may be configured to tune a slope of the lateral drop-off rate of the magnetic attraction force between the first, second, and third magnet arrays 106, 108, and 110. For example, with width of the center magnet 134 and the total distance moved (e.g., from the respective first relative position 115 to the second relative position 117 of the second and third magnet arrays 108 and 110) being 2.4 mm, the magnetic attraction force between the first, second, and third magnet arrays 106, 108, and 110 may decrease, for example, from 3.5 Newtons to 0 Newtons.

In another example implementation, an increase in the width of the magnet 134, at the same gap distance 130, may result to increase the amount of travel distance between the second and third magnet arrays 108 and 110 (e.g., from a respective first relative position to a second relative position) to reduce or reverse the magnetic attraction force between the first, second, and third magnet arrays 106, 108, and 110. Thus, when increasing the width of the magnet 134, a travel distance of the second and third magnet arrays 108 and 110 from a respective first relative position 115 to a second relative position 117 to achieve 0 Newtons (e.g., or a substantially reduced or reversed magnetic attraction force), may be slightly increased.

Referring to FIGS. 5-8, an example configuration of the activation mechanism 112 may include one or more components configured to receive an input and, in response, to move the second and third magnet arrays 108, 110 to at least one position. Activation mechanism 112 may be a mechanical system, an electrical system, a magnetic system, any combination thereof, or any other type of structure capable of moving the second and third magnet arrays 108, 110 to at least one position. For example, activation mechanism 112 may include one or more levers, one or more linkages, an electro-mechanical piston, a piezo-electric structure, a shape-memory alloy structure, etc.

In one implementation, for instance, activation mechanism 112 may include a user input device, such as a button cap 118 to be pushed by a user, a plunger 120 coupled to the button cap 118, and a switch 125 operable to activate or deactivate one or more functions on the device 101. For example, switch 125 may be an electrical switch to turn on or off an electrical function, such as but not limited to powering on (or off) a power system of the device 101, waking up the device 101 or a display screen on the device 101, etc., in response to contact by the depressed plunger 120. The switch 125 may be mounted to a button bracket 126, which is connectable to the second housing 104, in a position to be in contact with an end of the plunger 120 when the user presses the button cap 118 to move the plunger 120 to a depressed position. In an example implementation, the activation mechanism 112 may be a two-stage mechanism configured to open magnetic fastener 100, e.g., release the first housing 102 from the second housing 104, and also to turn on the device 101 via end of plunger 120 contacting and activating the switch 125 when the button cap 118 is pushed in all the way, e.g., at the end of travel of the plunger 120. In another example implementation, the switch 125 may be configured to turn on the device 101 when the button cap 118 is pressed at the beginning of a stroke or as the user is releasing the stroke. The switch 125 may be, for example, an electrical switch or a power switch configured to activate or deactivate various functions such as, but not limited to, power on or screen-wake functions.

Further, in this implementation, the activation mechanism 112 may include a lever 123 that operates in response to the depressing of the plunger 120 to laterally move the second and third magnet arrays 108 and 110 out of alignment, or further out of alignment, with the first magnet array 106. The lever 123 may be rotatably coupled to an axle 124 extending from a base member 151 mounted to the second housing 104 (FIG. 1). The lever 123 may include an engagement member 127, such as a post, that is contactable by an opposing portion, e.g., wall 129, of the plunger 120 such that movement of the plunger 120 in at least one direction, e.g., being depressed (or moving further into second housing 104) causes rotation of lever 123 about axle 124. As the ends of lever 123 may be in contact with respective side walls 107, 109 (see FIG. 9) of second and third magnet arrays 108, 110, the rotation of the lever 123 causes the lever 123 to extend laterally, and the ends of the lever 123 consequently push second and third magnet arrays 108, 110 laterally from an initial position, e.g., first relative position 115, to a new position, e.g., second relative position 117.

Additionally, in some cases, activation mechanism 112 may configured with one or more biasing mechanisms to reduce an amount of force needed to depress button 118 and plunger 120 to move second and third magnet arrays 108 and 110 from the first relative position 115 to the second relative position 117. As noted above, second and third magnet arrays 108 and 110 may be configured to be attracted to one another, thereby creating a magnetic force that opposes the depression of plunger 120. Depending on the attraction force and/or on the mechanical advantage achieved based on the design of lever 123, a user may find it difficult or uncomfortable to fully depress button 118 and plunger 120. As such, in one example implementation, activation mechanism 112 may include a first biasing mechanism 121 on one side of a wall extending from base member 151 to contact the second magnet array 108 and a second biasing mechanism 122 on the other side of a same or different wall extending from base member 151 to contact the third magnet array 110. Suitable examples of first and second biasing mechanisms 121 and 122 may include, but are not limited to, a spring, an elastomeric element, an actuator, an element made of a shape memory alloy, or any other structure capable of applying a biasing force to second and third magnet arrays 108 and 110 to oppose the magnetic attraction between them. Thus, activation mechanism 112 may include one or more biasing mechanisms, such as first and second biasing mechanisms 121 and 122, to reduce an amount of force needed to depress button 118 and plunger 120.

In another example implementation, the geometry of lever 123 (and/or plunger 120 and/or any other linkages or mechanisms used to transfer the motion of a received user input (e.g., depressing a button) to lateral movement of the second and third magnet arrays 108 and 110) may be varied or specifically-configured to increase or decrease the amount of force needed to depress button 118 and plunger 120 to move second and third magnet arrays 108 and 110 from the first relative position 115 to the second relative position 117. For instance, the geometry of lever 123 may be configured to perform more work (e.g., more movement of one or more magnet arrays) at the beginning of a plunger stroke and less work (e.g., less movement of one or more magnet arrays) at the end of the plunger stroke. Thus, for example, the design of lever 123 (and/or plunger 120/button 118 and/or any other linkages or mechanisms used to transfer the motion of a received user input) may be configured to affect a ratio of plunger to magnet motion through the stroke of the plunger.

In other words, the present implementations may utilize the lever mechanism geometry details to change the ratio of button to magnet motion through the stroke. For an implementation of activation mechanism 112 having plunger 120 and/or button 118 extending a relatively small amount from a housing (e.g., second housing 104) of device 101, without the current design, the plunger 120 and/or button 118 becomes harder to push the further in the plunger 120 and/or button 118 are pushed. For instance, this may be because the plunger 120 and/or button 118 can recess into compliant flesh of a user's thumb or finger that is pushing the plunger 120 and/or button 118. In contrast, the geometry of lever 123 (and/or plunger 120/button 118 and/or any other linkages or mechanisms used to transfer the motion of a received user input) can be configured to do more work at the beginning of the plunger/button stroke and less work at the end of the stroke. For instance, in FIG. 9A, 0.1 mm of plunger/button stroke may result in 0.3 mm of magnet array stroke; while in FIG. 9B, 0.1 mm of plunger/button stroke may only result in 0.1 mm of magnet array stroke. This change in relative stroke is determined by the configuration of the geometry of lever 123 (and/or plunger 120/button 118 and/or any other linkages or mechanisms used to transfer the motion of a received user input) utilized.

Additionally, in some configurations, as best seen in FIGS. 6-8, the plunger 120 may extend beyond a back end of the magnet arrays 108 and 110 in a direction toward the switch 125, depending on how closely the switch 125 can be mounted to the end of the plunger 120. Moreover, the plunger 120 may include a flange 157 that extends in the same lateral direction as, and overlaps with at least a portion of, the second and third magnet arrays 108 and 110. Similarly, button cap 118 also includes flanges 158, 159 that extend laterally, and substantially parallel to flange 157 of plunger 120. As such, when coupled to the button cap 118, the flange 157 and flanges 158, 159 may prevent the plunger 120 and/or the button cap 118 from rocking or rotating when the user pushes the button cap 118.

Figure 9:
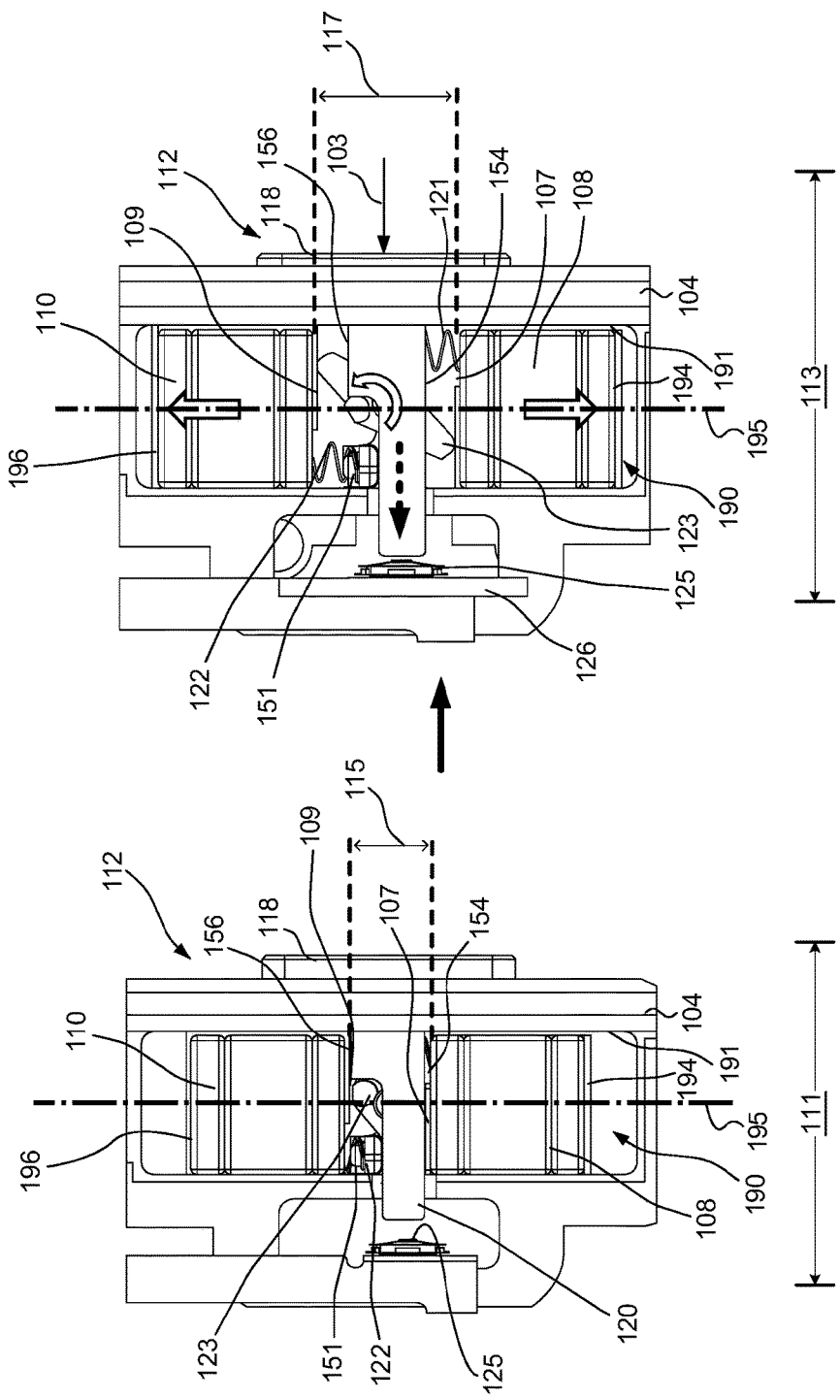
FIG. 9 is a top, cut away view of the magnetic fastener mounted within the second housing and moving from a closed position to an open position, e.g., with the magnet arrays moving from the first relative position to the second relative position, in response to the activation mechanism being actuated, e.g., a button being pressed.

Referring to FIG. 9, in an example implementation, activation mechanism 112 operates to control movement of second and third magnet arrays 108 and 110 within a channel 190 defined by at least one wall 191 within second housing 104. For example, activation mechanism 112 can control movement toward and/or away from each other of second and third magnet arrays 108 and 110 along a longitudinal axis 195, such as but not limited to a centerline of the channel 190. For instance, the magnetic attraction force between second and third magnet arrays 108 and 110 may naturally cause them to move together, and the structure of activation mechanism 112 may limit their movement to achieving first relative position 115. For example, the respective side walls 107, 109 of second and third magnet arrays 108 and 110 may come into contact with the respective side walls 154, 156 of the plunger 120, respectively, thereby limiting the closest position of the magnet arrays to be first relative position 115. As such, when the first and second housings 102, 104 are moved to be close to one another, then the second and third magnet arrays 108 and 110 begin to attract the first magnet array 106 and bias the device 101 into the closed position 111. In the closed position 111, the second and third magnet arrays 108 and 110 in the respective first relative position 115 are substantially aligned with the first magnet 106. When the user actuates the activation mechanism 112 by applying an activation force 103, e.g., a finger pushing the button cap 118, the lever 123 rotates about the axle 124, and the ends of the lever 123 move laterally, pushing on the respective side walls 107, 109 of second and third magnet arrays 108 and 110. In other words, the ends of lever 123 transfer at least a part of the activation force 103 to the second and third magnet arrays 108 and 110 to laterally move the magnet arrays 108 and 110 within the channel 190 to the second relative position 117. For instance, in some cases, the activation force 103 may be a force greater than the magnetic attraction force between the second and third magnet arrays 108, 110. In other cases, depending on the mechanical advantage of lever 123 and/or on the amount of spring force provided by one or more biasing mechanisms 121, 122, a value of the activation force 103 may be less or substantially less than the magnetic attraction force between the second and third magnet arrays 108, 110. As mentioned above, in one example, the total distance of lateral movement of the second and third magnet arrays 108 and 110 may be 2.4 mm, with each magnet array moving a distance of 1.2 mm in a direction away from the other magnet array. As such, in some geometry configurations of the plunger 120 and the lever 123, the stroke of the plunger 120 and/or button 118 may be less than the stroke (e.g., the amount of lateral movement) of each of the second and third magnet arrays 108, 110. For instance, in the above example, which should not be construed as limiting, a plunger/button stroke of 0.6 mm, which is half the 1.2 mm distance traveled by each of the second and third magnet arrays 108 and 110, may be achieved. It should be understood, however, that the geometry of the lever 123 and the plunger 120, or any other mechanisms or linkages used to transfer the motion of a received user input (e.g., depressing a button) to lateral movement of the second and third magnet arrays 108 and 110, may be varied to achieve any target ratio between input movement and output movement. According to an example implementation, a distance moved by the plunger 120 between an undepressed position and depressed position may be less than a lateral travel distance of the second magnet array 108 and the third magnet array 110 between the first relative position 115 and the second relative position 117. In this case, the button cap 118 may protrude from the device 101 a substantially lesser amount than a button on a device utilizing current solutions which require a button stroke to be the same as, or greater than, the amount of distance needed to move or displace magnets. Thus, activation mechanism 112 operates to move the second and third magnet arrays 108, 110 from the first relative position 115 to the second relative position 117, which enables device 101 to be moved from the closed position 111 to the open position 113 by essentially "unlocking" the magnetic fastener 100.

Additionally, in this example implementation, when the button cap 118 is pushed, the plunger 120 moves in a direction, towards the switch 125, and which is perpendicular to the magnetic forces of the magnet arrays 108 and 110. When the plunger 120 moves in the direction (as indicated by the dashed arrow) towards the switch 125, the lever 123 rotates in a counter clock-wise direction (as indicated by the arrow) about axle 124 to apply a lever force at the ends of the lever 123 contacting the second and third magnet arrays 108, 110. The lever force of lever 123 is opposite the magnetic attraction force between the second and third magnet arrays 108, 110. The lever 123 applies the lever forces to laterally move the second and third magnet arrays 108 and 110 to the second relative position 117. In this implementation, the biasing mechanisms 121, 122 are configured to assist the lever 123 with moving the magnet arrays 108 and 110 to the second relative position 117 and/or to reduce the amount of force 103. As mentioned, the first biasing mechanism 121 at one side of the base member 151 contacts the second magnet array 108 and the second biasing mechanism 122 at the other side of the base member 151 contacts the third magnet array 110. The biasing mechanisms 121, 122 are positioned at opposite sides of the base member 151 and, on each side, opposite the portion of the lever 123 configured to contact and apply force on the magnet arrays 108 and 110. As such, the biasing mechanisms 121, 122 may be configured to apply the same or similar amount of force on the magnet arrays 108 and 110 as the respective ends of the lever 123 to laterally move the magnet arrays 108 and 110 to the second relative position 117. This may help to make sure that the travel of the second and third magnet arrays 108 and 110 within the second housing 104 is substantially straight and/or may help so that the magnet arrays 108 and 110 are not rotated by the applied forces. In another example implementation, the biasing mechanisms 121, 122 may be configured to apply a force slightly less than the amount of force required to move the magnet arrays 108 and 110 to the second relative position 117 to minimize the amount of force 103 transferred through the plunger 120 and applied by the lever 123.

Referring to FIGS. 5-10, the example configuration of the second and third magnet arrays 108 and 110, and the first magnet array 106 (FIG. 10), may include respective frames 194, 196, and 192 for holding together the longitudinally extending magnets within each magnet array. In this example, the respective frames 192, 194, and 196 may be a u-shaped structure with side walls that define a channel within which the respective magnets are mounted. In some cases, one or more of the inner walls of the respective frames 192, 194, and 196 may include an adhesive layer to add in fixing the respective magnets within the respective frames 192, 194, and 196. Additionally, in some implementations, edges of the respective frames 192, 194, and 196 may be substantially aligned with edges of the respective magnet arrays 106, 108, and 110, while in other instances the respective frames 192, 194, and 196 may have one or more flanges that extend from the edges of the respective magnet arrays 106, 108, and 110, e.g., to improve handling for manufacturing/assembly and/or to provide surfaces against which activation mechanism 112 (e.g., one or more levers 123) may operate. It should be understood that this is one example of the respective frames 192, 194, and 196, and other structures capable of holding the respective magnets in relative position within the respective array may be utilized, or the respective magnets may be fixed together in another manner, e.g., using an adhesive, to maintain the configuration of each magnet array.

Figure 10:
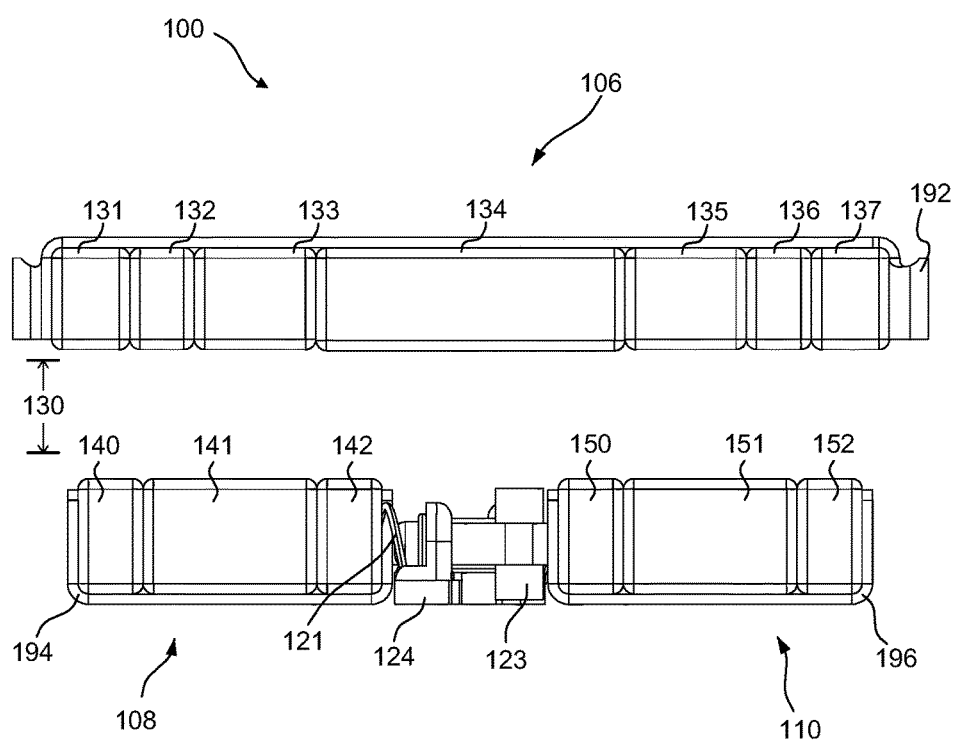
FIG. 10 is a front view of the magnetic fastener, with a part of a button cap and plunger of the activation mechanism removed to expose an example lever and biasing mechanism, with the second and third magnet arrays substantially aligned with the first magnet array to produce additive magnet fields, such as in the first relative position corresponding to the closed position of the device in FIG. 1.

Referring to specifically to FIG. 10, an example configuration of the magnetic fastener 100 includes the configuration of the activation mechanism 112 of FIGS. 5-9 is positioned between the second and third magnet arrays 108 and 110, as well as being spaced gap distance 130 away from the first magnet array 106. In this example, the second and third magnet arrays 108 and 110 are substantially aligned with the first magnet array 106 to produce additive magnetic fields, such as in the first relative position 115, e.g., also corresponding to the closed position 111 of the device 101.

Figure 11:
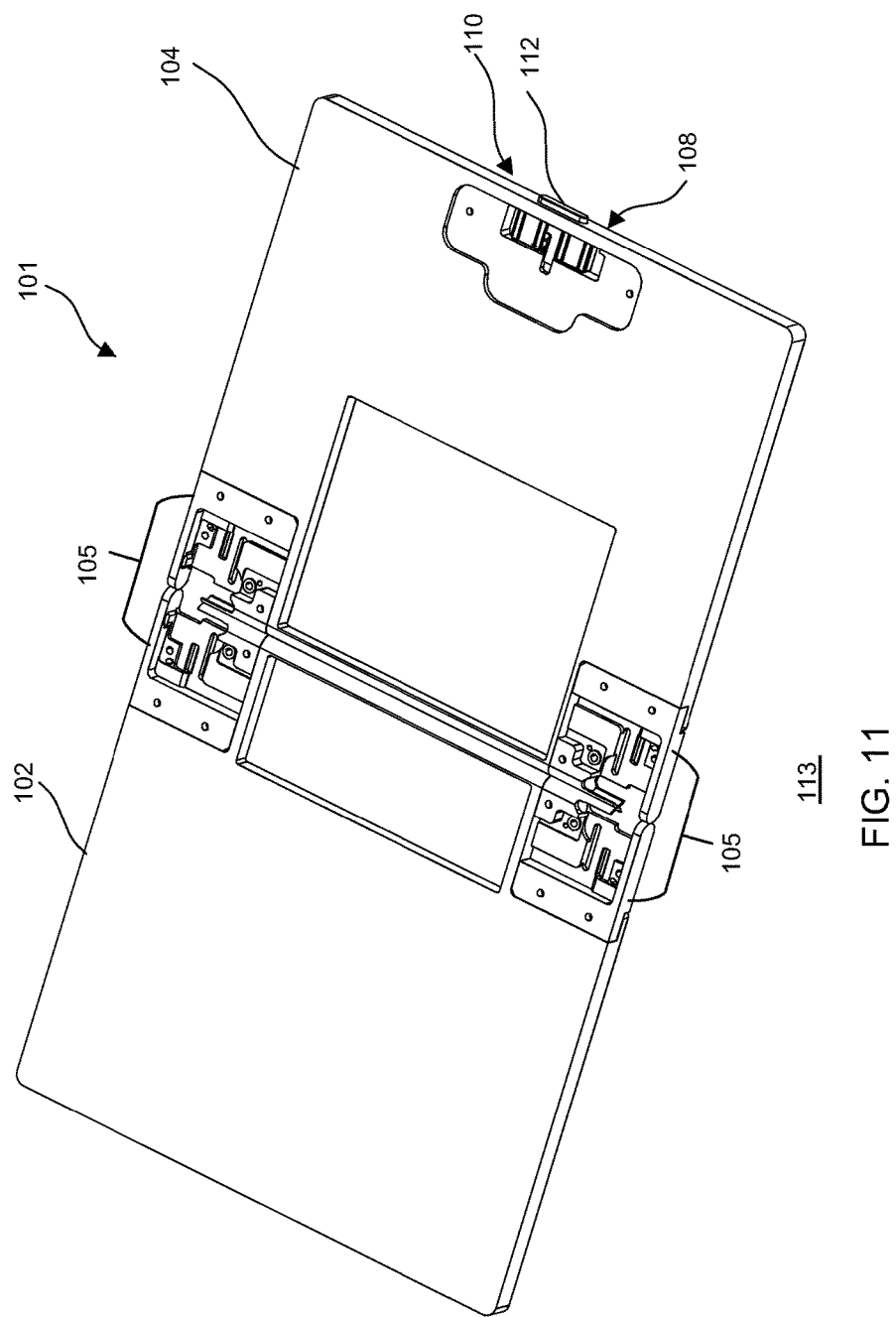
FIG. 11 is a perspective view of an opened position of one example of the hinged device with the magnetic fastener, including an opening in the second housing of the device within which the activation mechanism, the second magnet array, and the third magnet array of the magnetic fastener are mounted.

Referring to FIG. 11, an example configuration of device 101, in an open position 113, includes internal walls within the first housing 102 and the second housing 104 that allow for mounting all or a portion of the magnetic faster 100 and/or the connector 105. For instance, the back ends of both the first housing 102 and the second housing 104 may include one or more internal walls that provide mounting surfaces to which portions of connector 105 may be mounted. In this example configuration, connector 105 may include a pair of hinges mounted on the left and right sides of the back ends of each of the first housing 102 and the second housing 104. Further, in this example, the second housing 104 may include additional internal walls near the front end to provide surfaces and/or openings, e.g., in the top surface in this case, where the activation mechanism 112 and the second and third magnet arrays 108 and 110 may be mounted. Additional internal walls may define openings into which other components, e.g., computer devices, electronics, battery, etc., may be mounted.

Figure 12:
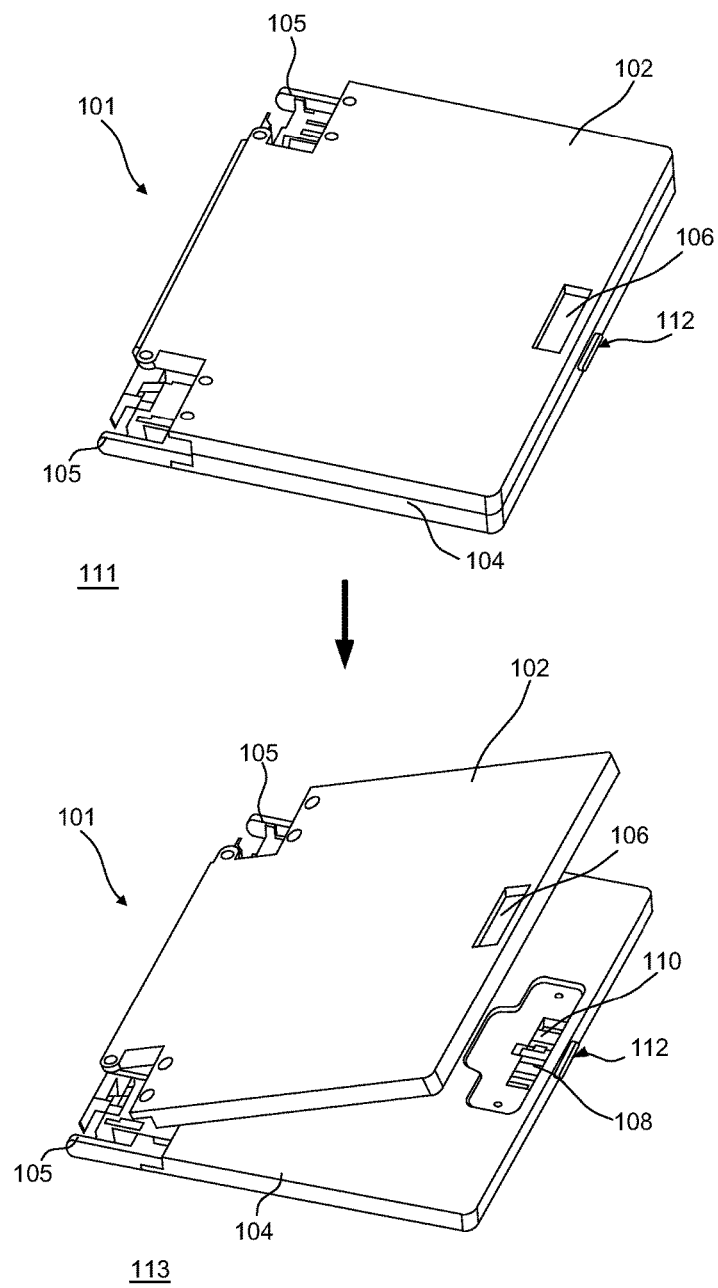
FIG. 12 is a perspective view of the device, including the magnetic fastener and with a part of the connector in the first housing removed for clarity, moving from a closed position to an open position, including an opening in the first housing within which the first magnet array is mounted and further including the opening in the second housing within which the activation mechanism, the second magnet array, and the third magnet array are mounted.

Referring to FIG. 12, of the example configuration of the device 101, moving from the closed position 111 to the open position 113, includes additional internal walls in the first housing 102, e.g., in the front end of the top surface in this case, where the first magnet array 106 may be mounted.

Figure 13:
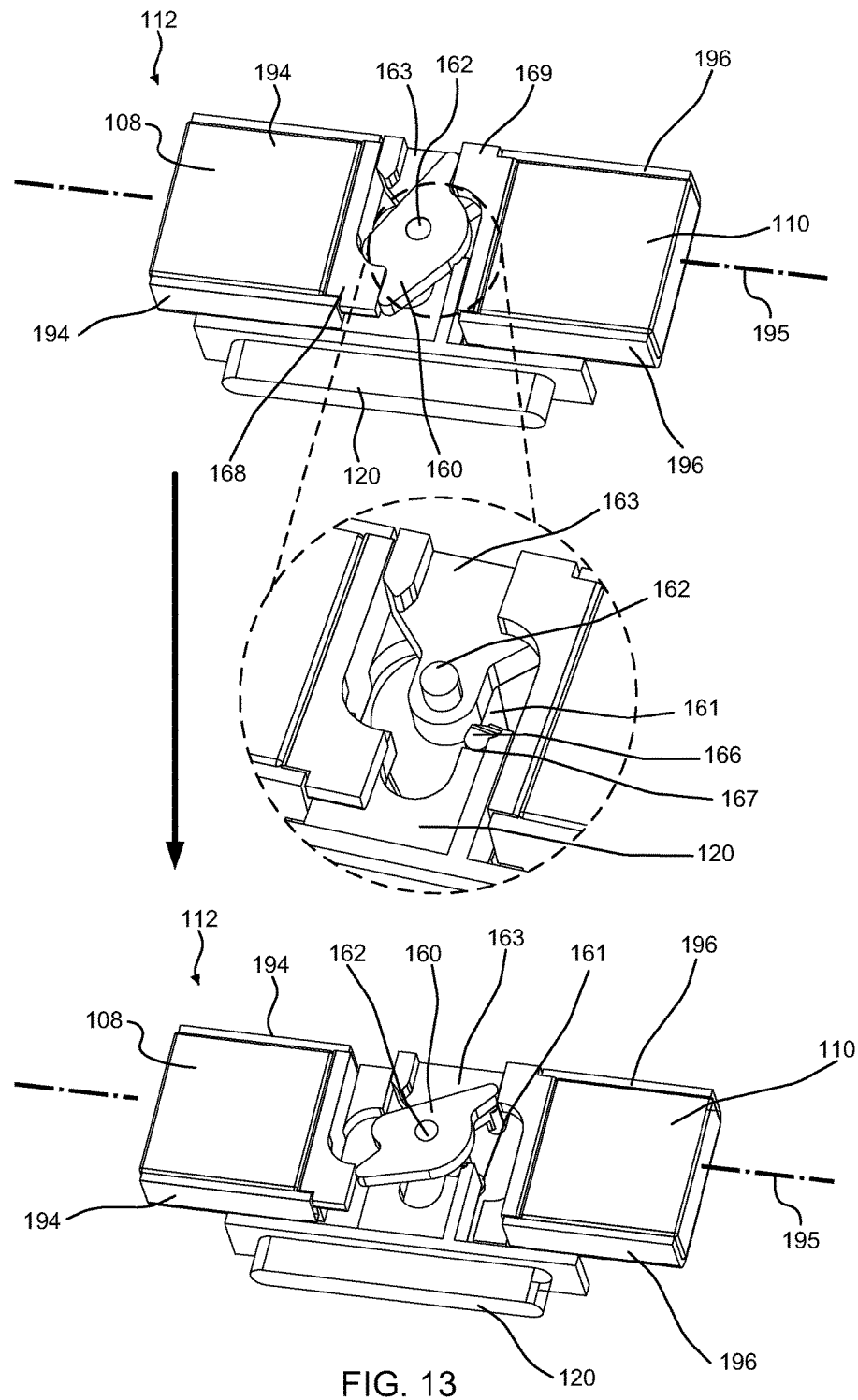
FIG. 13 is a perspective view of an example activation mechanism moving the second and third magnet arrays from a first relative position to a second relative position, including an inset figure with an example lever removed to expose further details, according to an implementation.

Referring to FIG. 13, another implementation of the activation mechanism 112 may be configured with a top lever 160 and a bottom lever 161 rotatable about an axle 162 extending from both sides of a base member 163. In this configuration, the top lever 160 and the bottom lever 163 may contact the adjacent magnet assembly, e.g., second and third magnet arrays 108 and 110 in this example, on opposite sides of a centerline of movement, e.g., a centerline of the longitudinal axis 195 of the channel 190 (see FIG. 9) in the second housing 104, thereby producing counteracting moment arms that reduce or eliminate rotation of the adjacent magnet assembly or one or more magnet arrays within the channel 190. As such, this dual lever configuration may reduce or eliminate friction associated with such movement within the channel 190, which can reduce an amount of force needed to be applied to cause such movement.

In the example configuration, one end of the top lever 160 is in contact with the second magnet array 108 while the other end is in contact with the third magnet array 110. Similarly, one end of the bottom lever 161 is in contact with the second magnet array 108 while the other end is in contact with the third magnet array 110. Each of the top lever 160 and the bottom lever 161 may include engagement member 166, such as a post (only shown on the bottom lever 161), extending toward the base member 163 and configured to contact an inner wall or shoulder 167 of the plunger 120. For example, when the button cap 118 (not shown) is pushed, the inner wall or shoulder 167 of the plunger 120 contacts the engagement members (only engagement member 167 shown) and transfers a force to cause the top and bottom levers 160 and 161 to rotate about axle 162. In turn, the ends of the levers 160 and 161 in contact with the second and third magnet arrays 108 and 110 move the second and third magnet arrays 108 and 110 in opposite directions towards the second relative position 117. Additionally, in some cases, the respective frames 194 and 196 of the second and third magnet arrays 108 and 110 may include inwardly extending lateral flanges 168 and 169 that are in contact with each end of each of the top and bottom levers 160 and 161. The flanges 168 and 169 may allow the ends of the top and bottom levers 160 and 161 to be used to control the limit of the first relative position 115 (as opposed to the side walls of the plunger 120). Further, by configuring the flanges 168 and 169 to extend toward the ends of the top and bottom levers 160 and 161, less rotation is required to move the second and third magnet arrays 108 and 110 a given lateral distance, and thus an amount of sliding at the lever/magnet array interface may be reduced, thereby reducing frictional losses. In other words, flanges 168 and 169 can be adjusted to modify the lever arm ratio, which in turn changes the required force input, and also has effect on the friction. In this implementation, the use of dual top and bottom levers 160, 161, allows lateral forces on the sides of each of the second and third magnet arrays 108 and 110 to be balanced, e.g., similar forces applied at substantially equal distances (e.g., equal moment arms) from a center (front-to-back) of each magnet array. This configuration reduces or eliminates any non-lateral force on the second and third magnet arrays 108 and 110, thereby helping to reduce or eliminate any rotation of the second and third magnet arrays 108 and 110 within the channel 190 (see FIG. 9). Additionally, this dual lever configuration creates opposing forces about the axle 162, thereby lowering forces on the axle 162.

Figure 14:
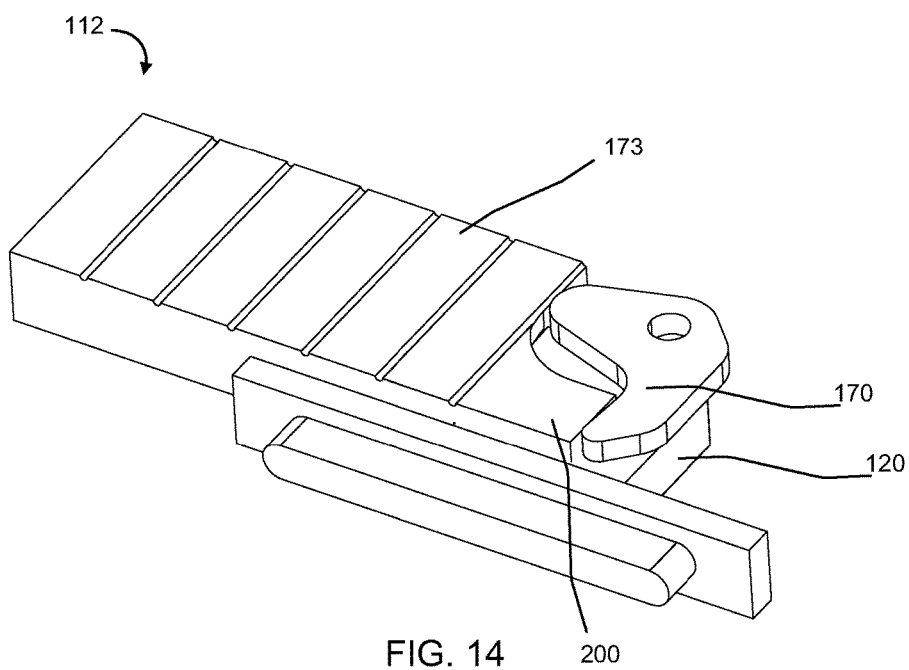
FIGS. 14 and 15 are a top perspective view and a bottom perspective view, respectively, of a portion of an example activation mechanism with a magnet array, according to an implementation.
Figure 15:
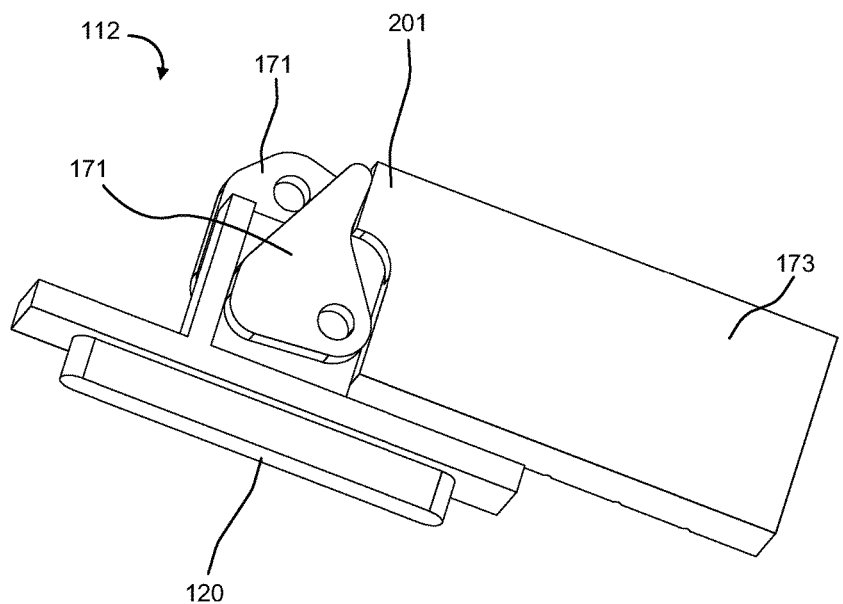

Referring to FIGS. 14 and 15, another implementation of the activation mechanism 112 may be configured with a top lever 170 and a bottom lever 171 each rotatable about different axles to move a single movable magnet array 173, which can be an integrated version of the second and third magnet arrays 108 and 110. For instance, the top lever 170 may be rotatable about a first axle (not shown) extending from a base member (not shown), while the bottom lever 171 may be rotatable about a second axle (not shown) extending from the base member. Although not illustrated, it should be noted that each of the top lever 170 and the bottom lever 171, and the plunger 120, have cooperating engagement members (e.g., post extending into hole) to enable at least a part of the force from translation of the plunger 120 to be transferred to rotate the levers. Notably, this example implementation may be utilized with a single movable magnet array 173 provided in the second housing 104 of the device 101 to laterally move from a respective first relative position to a respective second relative position. In the first relative position, the magnetic fields of the magnet array 173 may be substantially aligned with the portion of the magnetic fields of the first magnet array 106 in the first housing 102 of the device 101 to maintain the device 101 in a closed position 111. In the second relative position, the magnet array 173 may be misaligned with the first magnet array 106 to cause the magnetic attraction force to be substantially reduced, zeroed out, or reversed (relative to the first relative position), thereby unlocking the magnetic fastener 100 and enabling the device 101 to be moved to the open position 113. More specifically, the ends of levers 170 and 171 are in contact with flanges 200 and 201 extending from the top and bottom sides of the magnet array 173 in a first relative position, e.g., when the device 101 is in a closed position 111. In the example configuration, the plunger 120 (and, optionally, the button cap 118 (not shown)) is pushed such that a force is applied to the top lever 170 and the bottom lever 171 to rotatably move the levers 170, 171 in contact with the magnet array 173 to a second relative position that opens the device 101 to the open position 113. This configuration of the single movable magnet array 173 may allow for a simpler and more compact structure for the activation mechanism 112.

Figure 16:
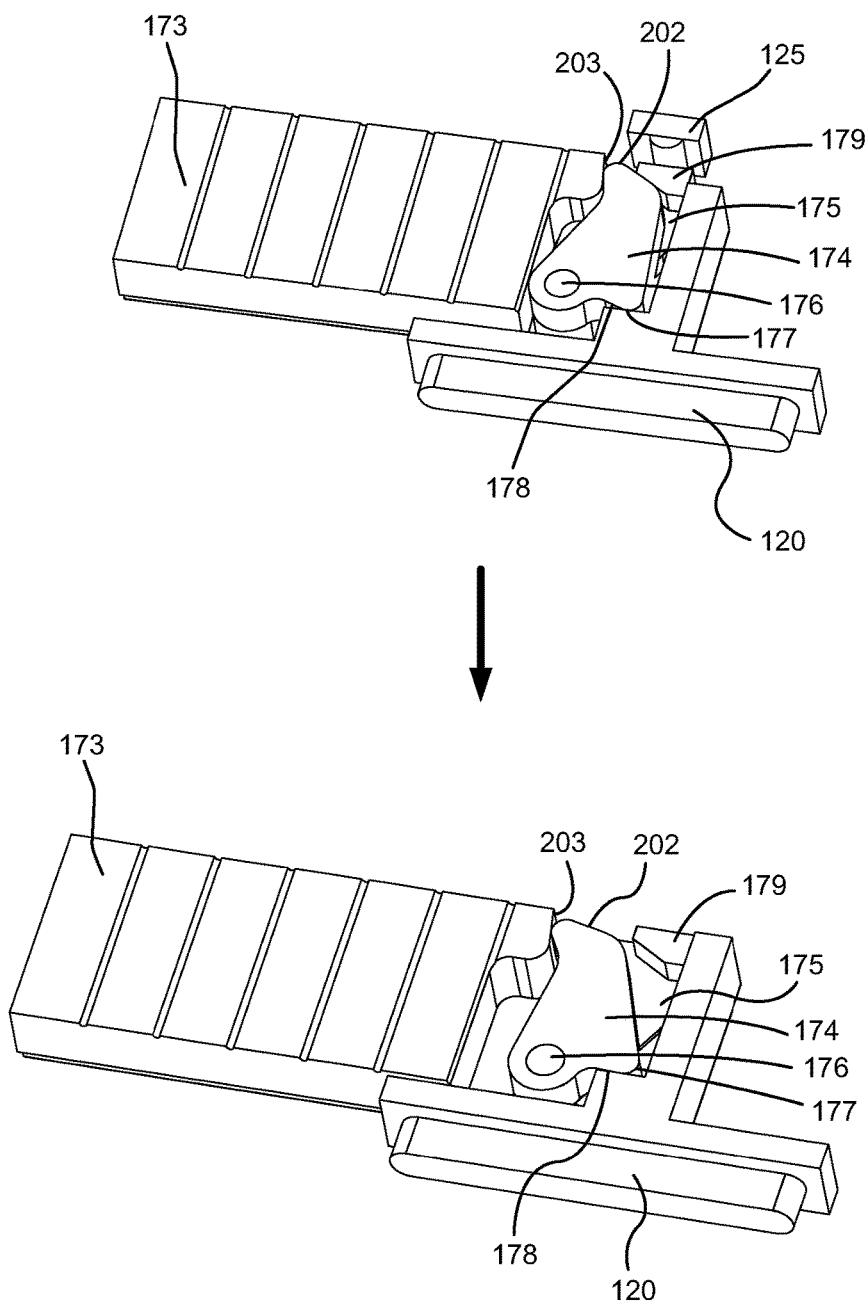
FIG. 16 is a perspective view of a portion of an example activation mechanism with a magnet array, according to another implementation.

Referring to FIG. 16, an example implementation of the activation mechanism 112 utilizing the single magnet array 173 (FIGS. 14 and 15) may be configured with one lever 174 and an axle carrier 175 movable to engage with the switch 125. In this implementation, the lever 174 is rotatable about an axle 176 extending from one side of the axle carrier 175, causing an end of the lever 174 that is in contact with the magnet array 173 to move the magnet array 173 to the second relative position to be relatively misaligned with the first magnet array 106, as described above with respect to FIGS. 14 and 15. Additionally, when the plunger 120 (and, optionally, the button cap 118 (not shown)) is pushed, the force transferred from an internal shoulder 178 of the plunger 120 to an end surface 177 of the lever 174 causes the lever 174 to rotate and also causes the axle carrier 175 to translate such that an end 179 of the axle carrier 175 moves into contact with and activates the switch 125, e.g., an electrical switch to activate or deactivate one or more functions such as, but not limited to, powering on or waking up the device 101. As mentioned, the switch 125 may be, for example, an electrical switch or a power switch configured to induce various functions such as, but not limited to, power on or screen-wake functions. In an example implementation, the switch 125 may be configured to turn on the device 101 when the plunger 120 is pressed at the beginning of a stroke or as the user is releasing the stroke. Further, the lever 174 may include an end surface 202 that contacts a side surface 203 of the single magnet array 173, where the surfaces are angled (e.g., not perpendicular to the axis of lateral movement of the magnet array 173) to reduce a tendency of the single magnet array 173 rotating (e.g., about an axis perpendicular to the top surface) due to the lever 174 pushing at the single interface. For example, at least the side surface 203 of the single magnet array 173 may be at an oblique angle, e.g., relative to the axis of lateral movement of the magnet array 173, that directs the force from the end surface 202 of the lever 174 toward a center of the single magnet array 173, e.g., to reduce the moment arm.

Figure 17:
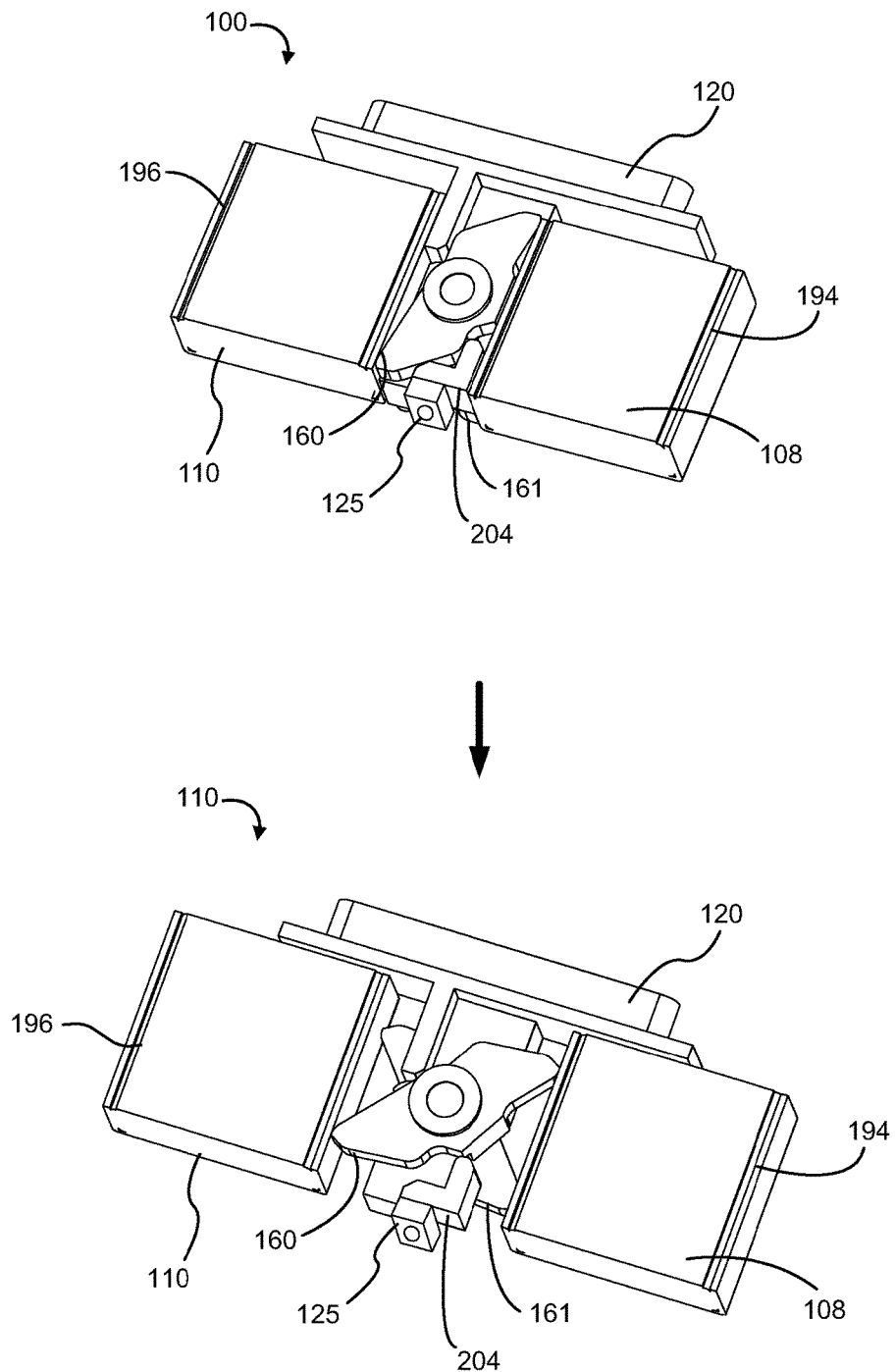
FIG. 17 is a perspective view of an example activation mechanism moving the second and third magnet arrays from a first relative position to a second relative position, according to an implementation.

Referring to FIG. 17, an example implementation of the activation mechanism 112 may be similar to the configuration of FIG. 13, but may further include a movable axle carrier 204 that can move to contact the switch 125. In an example, the axle carrier 204 may float within the channel 190 (see FIG. 9). For instance, when the plunger 120 (and, optionally, the button cap 118) is pushed, the force applied to move the top and bottom levers 160 and 161 also moves the axle carrier 176 such that the axle carrier 176 activates the switch 125 to turn on the device 101.

Figure 18:
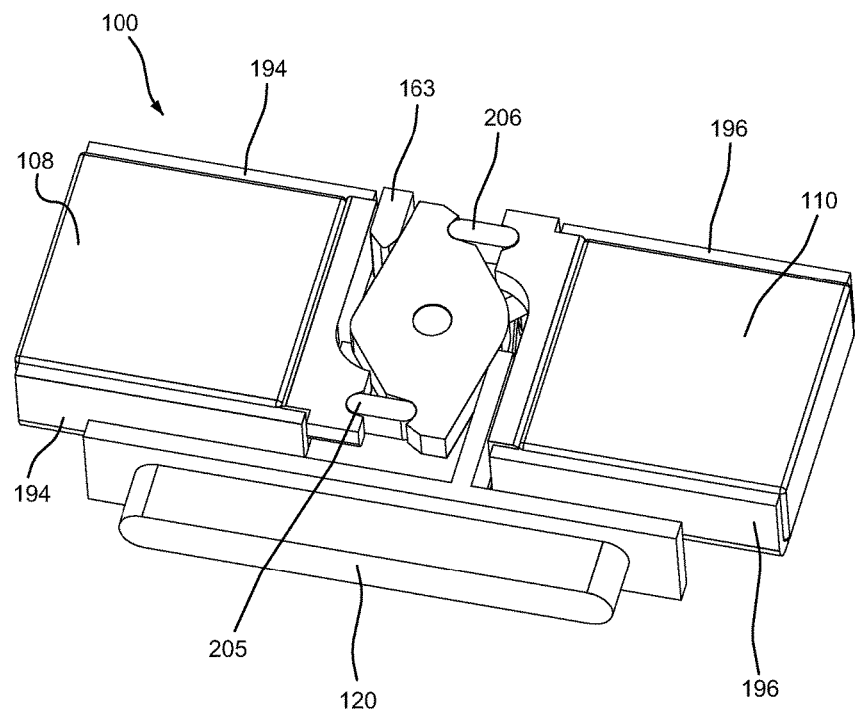
FIG. 18 is a perspective view of an example activation mechanism and the second and third magnet arrays, with linkages positioned between dual levers and the magnet arrays, according to an implementation.

Referring to FIG. 18, an example implementation of the activation mechanism 112 may be similar to the configuration of FIG. 13, but may further include linkages 178, 179 placed between the levers 160, 161 and the second and third magnet arrays 108 and 110 to eliminate a sliding friction between the levers 160, 161 and the second and third magnet arrays 108 and 110. For instance, the top lever 160 may be in contact at one end of the lever 160 with linkage 178 and at the other end of the lever 160 with linkage 179.

Figure 19:
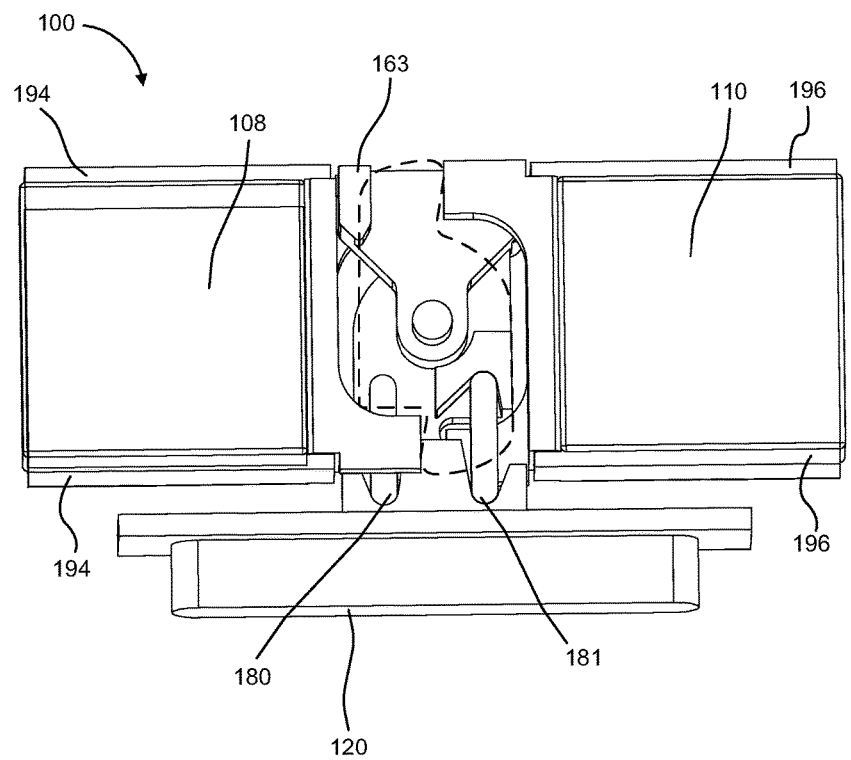
FIG. 19 is a perspective view of an example activation mechanism and the second and third magnet arrays, with linkages positioned between dual levers and a button cap, according to an implementation.

Referring to FIG. 19, an example implementation of the activation mechanism 112 may be similar to the configuration of FIG. 13, but may include linkages 180, 181 placed between the plunger 120 and the levers 160, 161 to eliminate a sliding friction therebetween.

Figure 20:
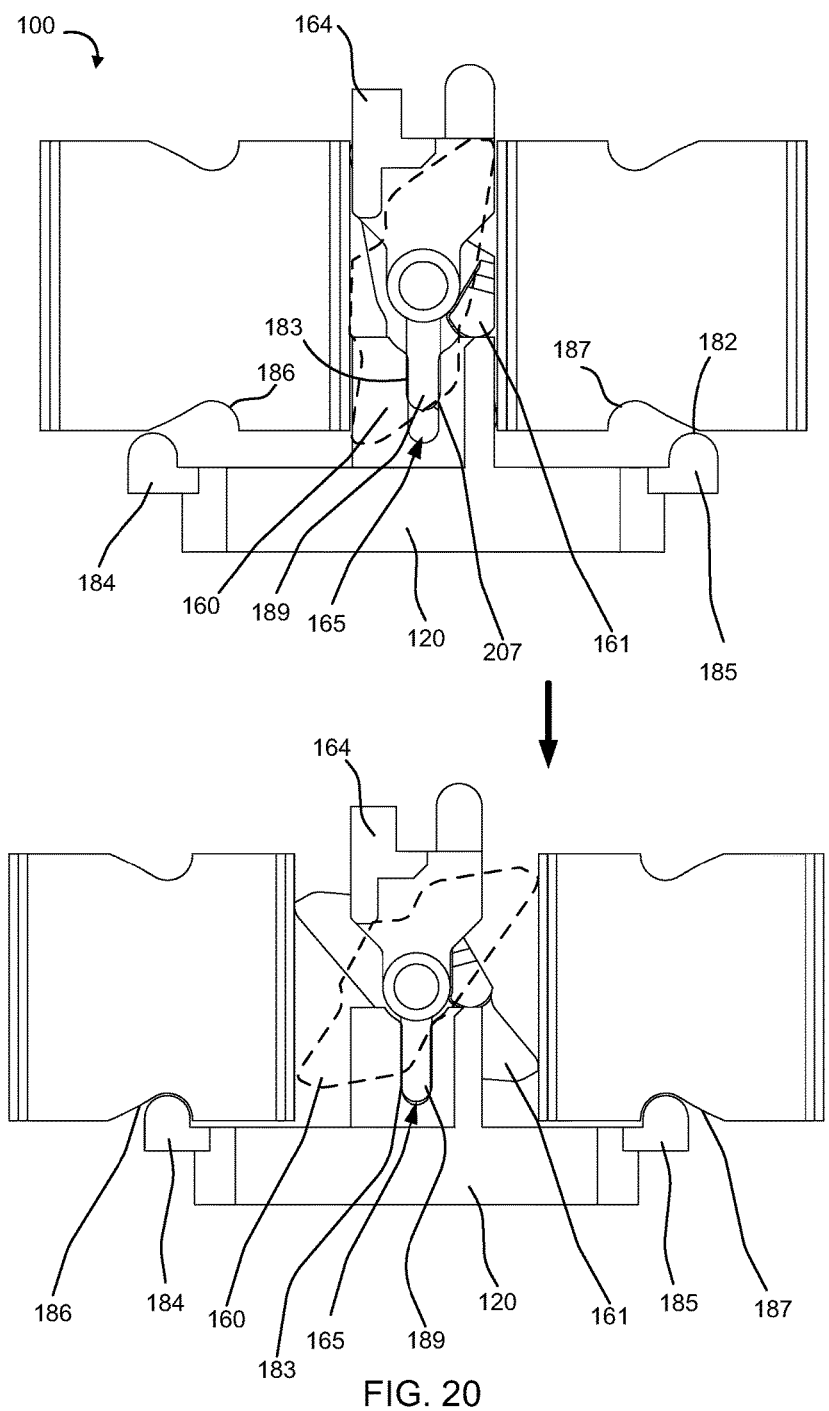
FIG. 20 is a top view of an example activation mechanism, with an anti-rock feature on the button cap, moving the second and third magnet arrays from a first relative position to a second relative position, according to an implementation.

Referring to FIG. 20, an example implementation of the activation mechanism 112 may be configured with one or two different anti-rock features to prevent the plunger 120 (and, optionally, the button cap 118) from rocking or rotating when the user pushes the plunger 120 and/or button cap 118. For instance, the anti-rock features may include anti-rock cams 182 and anti-rock slots 183 that limit off axis movement, e.g., rotation, of the plunger 120 when moving in and out of the activation mechanism 112. In one implementation, the anti-rock cams 182 include cooperating structures on the front side of the second and third magnet arrays 108 and 110, and on the back side of the plunger 120. For instance, the anti-rock cams 182 may include protruding portions 184, 185, extending from the back side of the plunger 120, which slidingly engage corresponding sloped surfaces 186, 187 on the front side of the second and third magnet arrays 108 and 110 when the plunger 120 is depressed. Additionally, in one implementation, the anti-rock slot 183 may include cooperating surfaces on the plunger 120 and a base member 164 that limit off axis movement, e.g., rotation, of the plunger 120 when moving in and out of the activation mechanism 112. For instance, in the illustrated example, the plunger 120 includes an internal wall 207 defining a slot 165 sized to receive a protruding member 189 extending from the base member 164. The slot 207 and the protruding member 189 are sized to have little or no space in between their surfaces, thereby limiting any rotation of the plunger 120 and/or button cap 118. As such, one or both of the anti-rock cam 182 and the anti-rock slot 183 may be used to limit rocking or rotating of the plunger 120 (and, optionally, the button cap 118) when moving in and out of the activation mechanism 112.

Figure 21:
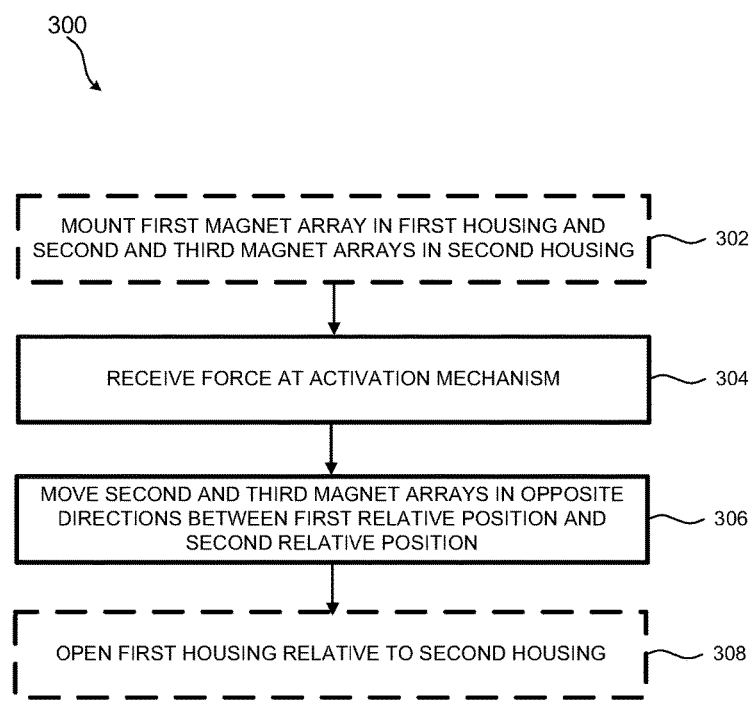
FIG. 21 is a flowchart of an example method of operation of the device of FIG. 1.

Referring to FIG. 21, in operation, one example of a method 300 of connecting or disconnecting a hinged device having a first and second housing is disclosed. The actions of method 300 may be discussed below with reference to the structures of FIGS. 1-20.

Optionally, at 302, method 300 may include mounting a first magnet array in a first housing and second and third magnet arrays in a second housing. For example, in an implementation, the device 101 may be configured with the first magnet array 106 mounted in the first housing 102 and second and third magnet arrays 108 and 110 mounted in the second housing 104. For instance, the first magnet array 106 may be fixedly positioned in the first housing 102 and may include the magnets 131-137 having different magnetic field orientations. The second magnet array 108 may be moveably positioned in the second housing 104 and may include the magnets 140-142 having different magnetic field orientations. The third magnet array 110 may be moveably positioned in the second housing 104 and may include the magnets 150-152 having different magnetic field orientations.

At 304, method 300 may include receiving a force at an activation mechanism to detach the first housing from the second housing. For example, in an implementation, the user of the device 101 may apply a force to the activation mechanism 112 to move the second magnet array 108 and the third magnet array 110 between the different relative positions, e.g., at least the first relative position 115 and the second relative position 117.

At 306, method 300 may include moving, by the force at the activation mechanism, the second magnet array and the third magnet array in opposite directions between a first relative position and a second relative position. For example, in an implementation, the force received by the activation mechanism 112 may cause the activation mechanism 112 to move the second magnet array 108 and the third magnet array 110 in opposite directions between the first relative position 115 and the second relative position 117. The first, second, and third magnet arrays 106, 108, and 110 may have a first magnetic attraction force in the respective first relative position 115 of the second and third magnet arrays 108 and 110 that may differ from a second magnetic attraction force between the first, second, and third magnet arrays 106, 108, and 110 in the respective second relative position 117 of the second and third magnet arrays 108 and 110. As such, moving the second magnet array 108 and third magnet array 110 in opposite directions between the first relative position 115 and the second relative position 117 may reduce the magnetic attraction force between the first, second, and third magnet arrays 106, 108, and 110.

In some implementations, the center magnet, e.g., magnet 134, of the first magnet array 106 may be altered in size to control (e.g., modify or tune), at least partially, the amount of magnetic attraction force between the second and third magnet arrays 108 and 110.

In some implementations, the activation mechanism 112 may include at least one biasing mechanism such as, e.g., an actuator, lever, or biasing element, having a biasing force to assist moving the second magnet array 108 and the third magnet array 110 from the first relative position 115 to the second relative position 117.

Thus, optionally, at 308, method 300 may include opening the first housing relative to the second housing. For example, in an implementation, due to the decreased, zeroed out, or reversed magnetic force caused by movement of the second magnet array 108 and the third magnet array 110 in opposite directions between the first relative position 115 and the second relative position 117, the first housing 102 may be open relative to the second housing 104.

Additionally, it should be understood that the present disclosure relates to a computer device (e.g., device 101) having fastener (e.g., magnetic fastener 100) having at least a first portion movable relative to a second portion (e.g., second magnet array 108 and third magnet array 110) between an open position (e.g., second relative position 117 corresponding to open position 113 of device 101) and a closed position (e.g., first relative position 115 corresponding to closed position 111 of device 101), an activation mechanism (e.g., activation mechanism 112), and a switch (e.g., switch 125). The activation mechanism includes a plunger (e.g., plunger 120) having a longitudinal body with an end, the plunger movable between an undepressed position and a depressed position (e.g., see FIG. 9 and the two positions of plunger 120), and an actuator (e.g., lever 123) configured to move the first portion and the second portion of the fastener from a first relative position (e.g., first relative position 117) to a second relative position (e.g., second relative position 117) in response to the plunger moving from the undepressed position to the depressed position. Further, one of the first relative position and the second relative position corresponds to the open position of the fastener (e.g., see FIG. 9), and wherein a remaining one of the first relative position and the second relative position corresponds to the closed position of the fastener (e.g., see FIG. 9). Additionally, the switch is contactable by the end of the plunger in the depressed position, wherein the switch is configured to activate or deactivate another function (e.g., powering on, waking up, etc.) on the computer device. Any combination of the above-described structure and functionality of device 101, magnetic fastener 100, and activation mechanism 112 may also apply to this implementation of a computer device.

In accordance with the above-described implementations, a fast drop-off in the magnetic attraction force may be achieved with a relatively small mechanical movement and travel distance, as compared to existing designs, to reduce, break, or reverse the magnetic attraction between the opposing magnet arrays, which may be installed on opposing portions of a hinged device. In an implementation, the attraction force may quickly reduce when at least one of the opposing sets of magnet arrays are moved laterally, thereby enabling separation of the opposing portions of a hinged device.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus, comprising:
    a first housing;
    a second housing rotatably connected to the first housing such that the second housing and the first housing are movable between a closed position and an open position;
    a first magnet array having a first plurality of magnets with different magnetic field orientations fixedly positioned in the first housing and having a first magnetic field;
    an adjacent magnet assembly relative to the first magnet array, the adjacent magnet assembly including one or more magnet arrays of a plurality of magnets with three or more magnetic field orientations defining at least a second magnetic field alignable with at least a portion of the first magnetic field; and
    an activation mechanism configured to move the adjacent magnet assembly from at least a first relative position to a second relative position,
    wherein the adjacent magnet assembly in the second relative position has a second magnetic attraction force with the first magnet array that is substantially reduced as compared to a first magnetic attraction force with the first magnet array in the first relative position;
    wherein the adjacent magnet assembly comprises at least a second magnet array and a third magnet array, the second magnet array having a second plurality of magnets with different magnetic field orientations defining a second magnetic field alignable with a first portion of the first magnetic field, and the third magnet array having a third plurality of magnets with different magnetic field orientations defining a third magnetic field alignable with a second portion of the first magnetic field, wherein the second magnet array and the third magnet array are movably positionable relative to one another in the second housing.

2. The apparatus of claim 1, wherein in the second relative position, a value of the second magnetic attraction force allows the first housing and the second housing to move to the open position.

3. The apparatus of claim 1, wherein in the first relative position, at least the second magnetic field of the adjacent magnet assembly is substantially aligned with at least the portion of the first magnetic field of the first magnetic array, wherein in the second relative position, at least the second magnetic field of the adjacent magnet assembly is misaligned with at least the portion of the first magnetic field of the first magnetic array.

4. The apparatus of claim 1, wherein each of the first magnet array and the adjacent magnet assembly comprise a plurality of magnets, wherein a size of a center one of the plurality of magnets of the first magnet array and a gap distance between the first magnet array and the adjacent magnet assembly is configured to at least partially control a magnetic attraction force and magnetic attraction drop off rate between the first magnet array and the adjacent magnet assembly.

5. The apparatus of claim 1, wherein the first magnet array comprises a flux fountain, and the adjacent magnet assembly comprises at least a partial flux fountain.

6. The apparatus of claim 1, wherein the activation mechanism is configured to move the second magnet array and the third magnet array between the first relative position and the second relative position, wherein the second magnet array and the third magnet array have the second magnetic attraction force with the first magnet array in the second relative position, and have the first magnetic attraction force with the first magnet array in the first relative position.

7. The apparatus of claim 6, wherein in the first relative position, the second magnetic field of the second magnet array is substantially aligned with the first portion of the first magnetic field of the first magnetic array, and the third magnetic field of the third magnet array is substantially aligned with the second portion of the first magnetic field of the first magnetic array.

8. The apparatus of claim 6, wherein a relative distance between the second magnet array and the third magnet array within the second housing increases when moving from the first relative position to the second relative position.

9. The apparatus of claim 1, wherein each of the first magnet array, the second magnet array, and third magnet array comprise a plurality of magnets, wherein a size of a center one of the plurality of magnets of the first magnet array and a gap distance to the first magnet array and the second magnet array is configured to at least partially control a magnetic attraction force and magnetic attraction drop off rate between the first magnet array and the second magnet array and the third magnet array.

10. The apparatus of claim 1, wherein the first magnet array comprises a flux fountain, and the second magnet array and the third magnet array each comprise a partial flux fountain.

11. The apparatus of claim 1, wherein the second magnet array and the third magnet array in the second relative position have a sufficient misalignment with the first magnet array to create a repelling force with the first magnet array.

12. The apparatus of claim 1, wherein the activation mechanism comprises:
    a plunger having a longitudinal body with an end, the plunger movable between undepressed position and a depressed position;

an actuator configured to move the adjacent magnet assembly toward the second relative position in response to the plunger moving from the undepressed position to the depressed position; and
a switch contactable by the end of the plunger in the depressed position, wherein the switch is configured to activate or deactivate a function on the apparatus.

13. The apparatus of claim 12, wherein the activation mechanism comprises at least one biasing mechanism having a biasing force to help move the adjacent magnet assembly from the first relative position to the second relative position.

14. The apparatus of claim 13, wherein an amount of the biasing force of the at least one biasing mechanism is configured to substantially reduce a force received by the plunger to cause the adjacent magnet assembly to move from the first relative position to the second relative position.

15. The apparatus of claim 12, wherein a distance moved by the plunger between the undepressed position and the depressed position is less than a lateral travel distance of the adjacent magnet assembly between the first relative position and the second relative position.

16. The apparatus of claim 12, wherein the activation mechanism comprises at least one lever positioned to contact the plunger and the adjacent magnet assembly to move the adjacent magnet assembly from the first relative position to the second relative position.

17. The apparatus of claim 12, wherein the second housing includes at least one internal wall defining a channel, wherein the adjacent magnet assembly is movable about a longitudinal axis defining a centerline within the channel, and wherein the activation mechanism comprises a first lever and a second lever each positioned to contact the plunger and the adjacent magnet assembly, wherein the first lever and the second lever contact the adjacent magnet assembly on opposite sides of the centerline of the channel.

18. The apparatus of claim 1, wherein the activation mechanism comprises:
a plunger having a longitudinal body with an end, the plunger movable between an undepressed position and a depressed position;
an actuator configured to move the second magnet array and the third magnet array second relative position in response to the plunger moving from the undepressed position to the depressed position; and
a switch contactable by the end of the plunger in the depressed position, wherein the switch is configured to turn on power to the apparatus.

19. A method of connecting or disconnecting a hinged device having a first and second housing, comprising:
receiving a force at an activation mechanism to detach the first housing from the second housing, the first housing including a first magnet array having a first plurality of magnets with different magnetic field orientations fixedly positioned in the first housing, and the second housing including a movably positionable adjacent magnet assembly including one or more magnet arrays having at least a second plurality of magnets with three or more magnetic field orientations; and
moving, by the force at the activation mechanism, the adjacent magnet assembly between a first relative position and a second relative position;
wherein the adjacent magnet assembly in the second relative position has a second magnetic attraction force with the first magnet array that is substantially reduced as compared to a first magnetic attraction force with the first magnet array in the first relative position;

wherein the adjacent magnet assembly comprises at least a second magnet array and a third magnet array, the second magnet array having a second plurality of magnets with different magnetic field orientations defining a second magnetic field alignable with a first portion of the first magnetic field, and the third magnet array having a third plurality of magnets with different magnetic field orientations defining a third magnetic field alignable with a second portion of the first magnetic field, wherein moving the adjacent magnet assembly further includes moving the second magnet array and the third magnet array in opposite directions.

20. The method of claim 19, wherein a size of a center one of the plurality of magnets of the first magnet array and a gap distance to the adjacent magnet assembly is configured to at least partially control a magnetic attraction force and magnetic attraction drop off rate between the first magnet array and the adjacent magnet assembly.

21. The method of claim 19, wherein the first magnet array comprises a flux fountain, and the adjacent magnet assembly comprises at least a partial flux fountain.

22. The method of claim 19, wherein the activation mechanism comprises at least one biasing mechanism having a biasing force to help move the adjacent magnet assembly from the first relative position to the second relative position.

23. The method of claim 22, wherein an amount of the biasing force of the at least one biasing mechanism is configured to substantially reduce a force received by a plunger in the activation mechanism to cause the adjacent magnet assembly to move from the first relative position to the second relative position.

24. A computer device, comprising:
a magnetic fastener having at least a first portion movable relative to a second portion between an open position and a closed position, wherein the first portion includes a first magnetic array having a first plurality of magnets with different magnetic field orientations fixedly positioned in the first portion and having a first magnetic field and the second portion having a second magnetic array having a second plurality of magnets three or more different magnetic field orientations and a second magnetic field alignable with at least a portion of the first magnetic field;
an activation mechanism, including:
a plunger having a longitudinal body with an end, the plunger movable between an undepressed position and a depressed position;
an actuator configured to move at least one of the first portion and the second portion of the magnetic fastener from a first relative position to a second relative position in response to the plunger moving from the undepressed position to the depressed position, wherein one of the first relative position or the second relative position corresponds to the open position of the magnetic fastener, and wherein a remaining one of the first relative position or the second relative position corresponds to the closed position of the magnetic fastener, wherein the second magnetic array in one of the first relative position or the second relative position has a first magnetic attraction force with the first magnetic array that is substantially stronger than a second magnetic attraction force with the first magnetic array when the second magnetic array is in the other one of the first relative position or the second relative position, wherein the adjacent magnet assembly comprises at least a second magnet array and a third magnet array, the second magnet array having a second plurality of magnets with different magnetic field orientations defining a second magnetic field alignable with a first portion of the first magnetic field, and the third magnet array having a third plurality of magnets with different magnetic field orientations defining a third magnetic field alignable with a second portion of the first magnetic field, wherein the second magnet array and the third magnet array are movably positionable relative to one another in the second housing; and a switch contactable by the end of the plunger in the depressed position, wherein the switch is configured to activate or deactivate a function on the computer device.

25. The computer device of claim 24, wherein mechanism comprises at least one biasing mechanism having a biasing force to help move at least one of the first portion and the second portion of the magnetic fastener from the first relative position to the second relative position.

26. The computer device of claim 24, wherein the mechanism comprises at least one lever positioned between the plunger and at least one of the first portion and the second portion to move the at least one of the first portion and the second portion of the magnetic fastener from the first relative position to the second relative position.

* * * * *